US008964221B2

(12) United States Patent
Sato

(10) Patent No.: US 8,964,221 B2
(45) Date of Patent: Feb. 24, 2015

(54) IMAGE FORMING APPARATUS AND CONTROL METHOD FOR THE IMAGE FORMING APPARATUS

(75) Inventor: Hideo Sato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/517,867

(22) Filed: Jun. 14, 2012

(65) Prior Publication Data

US 2013/0003090 A1     Jan. 3, 2013

(30) Foreign Application Priority Data

Jun. 28, 2011    (JP) ................................ 2011-142868

(51) Int. Cl.
*G06F 15/00*      (2006.01)
*H04N 1/60*      (2006.01)
*G03G 15/00*      (2006.01)

(52) U.S. Cl.
CPC ........ *G03G 15/5062* (2013.01); *G03G 15/5079* (2013.01); *H04N 1/60* (2013.01); *G03G 2215/0164* (2013.01)
USPC .......... 358/1.15; 358/1.9; 358/3.26; 358/504; 358/518; 358/523

(58) Field of Classification Search
USPC .......................... 358/1.9, 1.15, 3.23, 518–525
See application file for complete search history.

(56) References Cited

U.S. PATENT DOCUMENTS

| 5,481,249 | A | 1/1996 | Sato ........................ 340/825.06 |
| 6,043,902 | A | 3/2000 | Sato .............................. 358/434 |
| 6,047,288 | A | 4/2000 | Kurosawa et al. ................ 707/9 |
| 6,286,034 | B1 | 9/2001 | Sato et al. ..................... 709/204 |
| 7,031,022 | B1 * | 4/2006 | Komori et al. ................. 358/1.9 |
| 8,270,015 | B2 | 9/2012 | Sato ............................. 358/1.15 |
| 2002/0154325 | A1 * | 10/2002 | Holub ............................ 358/1.9 |
| 2004/0001208 | A1 * | 1/2004 | Murakami .................... 358/1.9 |
| 2005/0254074 | A1 * | 11/2005 | Kalinka et al. ................ 358/1.9 |
| 2008/0218777 | A1 * | 9/2008 | Matsuzawa et al. .......... 358/1.9 |
| 2008/0231874 | A1 * | 9/2008 | Matsuzawa et al. .......... 358/1.9 |
| 2009/0153898 | A1 | 6/2009 | Sato ............................. 358/1.15 |
| 2010/0157337 | A1 * | 6/2010 | Akado et al. .................. 358/1.9 |
| 2011/0013210 | A1 * | 1/2011 | Yamaguchi .................... 358/1.9 |
| 2011/0109921 | A1 * | 5/2011 | Paul et al. ..................... 358/1.9 |

FOREIGN PATENT DOCUMENTS

| JP | 2003-107833 A | 4/2003 |
| JP | 2006-165864 A | 6/2006 |

* cited by examiner

*Primary Examiner* — Richard Zhu
(74) *Attorney, Agent, or Firm* — Fitzpatrick, Cella, Harper & Scinto

(57) ABSTRACT

An image forming apparatus not having a measuring sensor and an image forming apparatus having a measuring sensor are arbitrarily combined with each other to thereby achieve calibration with respect to the image forming apparatus not having the sensor. A color printer obtains measuring instrument information on measurement of a color in the image forming apparatus having the measuring sensor, and generates a chart image. A measuring printer measures the chart image using measurement chart information including conditions for measuring the chart image transmitted from the color printer.

18 Claims, 28 Drawing Sheets

| INPUT | | | | OUTPUT | | | |
|---|---|---|---|---|---|---|---|
| K | C | M | Y | K2 | C2 | M2 | Y2 |
| 0 | 0 | 0 | 0 | 0 | 0 | 0 | 0 |
| 0 | 0 | 0 | 36 | 0 | 0 | 0 | 32 |
| 0 | 0 | 0 | 72 | 0 | 0 | 0 | 73 |
| ⋮ | ⋮ | ⋮ | ⋮ | ⋮ | ⋮ | ⋮ | ⋮ |
| 0 | 0 | 0 | 255 | 0 | 0 | 0 | 255 |
| 0 | 0 | 36 | 0 | 0 | 0 | 31 | 0 |
| 0 | 0 | 36 | 36 | 0 | 0 | 30 | 33 |
| 0 | 0 | 36 | 72 | 0 | 0 | 32 | 75 |
| ⋮ | ⋮ | ⋮ | ⋮ | ⋮ | ⋮ | ⋮ | ⋮ |
| 0 | 0 | 36 | 255 | 0 | 0 | 32 | 253 |
| ⋮ | ⋮ | ⋮ | ⋮ | ⋮ | ⋮ | ⋮ | ⋮ |
| 255 | 255 | 255 | 255 | 255 | 255 | 255 | 255 |

FIG.6

| MEASURING INSTRUMENT INFORMATION ||
|---|---|
| NUMBER OF SENSORS | 3 |
| UNIT | pix(600dpi) |
| X1 | 700 |
| X2 | 3500 |
| X3 | 6300 |
| Xstart | 0 |
| Xend | 7015 |
| Ystart | 100 |
| Y1 | 100 |
| Yend | 9921 |
| PATCH LENGTH | 600 |
| PATCH WIDTH | 200 |

FIG.9

| MEASUREMENT CHART INFORMATION ||
|---|---|
| NUMBER OF CHARTS | 5 |
| NUMBER OF LATTICE POINTS | 8×8×8×8 |
| bit DEPTH | 8 |
| MAXIMUM APPLICATION AMOUNT | 200 |
| PAPER SIZE | A4 |
| NUMBER OF PATCHES/PAPER | 21 |
| CORRECTION TARGET | |
| PATCH 001 | (L1 A1 B1) |
| PATCH 002 | (L2 A2 B2) |
| ⋮ | ⋮ |
| CMY→ L*a*b* TABLE | |
| LATTICE POINT 1 | (l1 a1 b1) |
| LATTICE POINT 2 | (l2 a2 b2) |
| ⋮ | ⋮ |
| L*a*b*→ CMY TABLE | |
| LATTICE POINT 1 | (C1 M1 Y1) |
| LATTICE POINT 2 | (C2 M2 Y2) |
| ⋮ | ⋮ |

FIG.10

IMAGE FORMING APPARATUS AND CONTROL METHOD FOR THE IMAGE FORMING APPARATUS

BACKGROUND OF THE INVENTION

1. Field of the Invention

The present invention relates to an image forming apparatus and a control method for the image forming apparatus for correcting a color.

2. Description of the Related Art

In recent years, high picture quality of an output image has been required for a color image forming apparatus employing electrophotography system, inkjet systems, etc., such as a color printer and a color copier. Particularly, density gradation and color stability have a large effect on determining whether image quality is good or poor.

Since density changes occur due to even slight environmental changes particularly in a color image forming apparatus of the electrophotography system, it is necessary to have a unit configured to always keep gradation property of a constant density.

Consequently, in a conventional color image forming apparatus, a sensor which detects a density is provided on a photoconductive drum of the electrophotography system or on a primary transfer belt, and a gradation characteristic of each color of C (cyan), M (magenta), Y (yellow), and K (black) is measured. Additionally, in the color image forming apparatus, mounted is a calibration technology which creates an LUT (Look Up Table) for one-dimensional gradation correction with respect to each color. The LUT is the table indicating output data corresponding to input data separated at a specific interval, and it can represent a nonlinear characteristic which cannot be expressed by an arithmetic expression. The LUT for one-dimensional gradation correction represents each output signal value on the side of an image forming apparatus capable of representing each input signal value of C, M, Y, and K. The image forming apparatus forms an image on a paper using toner corresponding to the output signal value.

In creating the one-dimensional LUT, a chart including a patch of data with different gradation corresponding to each toner of C, M, Y, and K is prepared and output by the image forming apparatus. A value of the chart output by the image forming apparatus is read using the above-described sensor or scanner of the image forming apparatus, or a color measuring instrument (colorimeter) other than the image forming apparatus, etc. A one-dimensional LUT for correction is created independently for C, M, Y, and K by comparing the read value with previously provided target data.

However, since a nonlinear difference occurs in a "color mixture" using a plurality of toner, such as red, green, blue, and gray using CMY, according to the image forming apparatus even though a single color gradation characteristic is corrected by the one-dimensional LUT, it is difficult to assure the color. Consequently, proposed is a technology in which a chart created with the a color mixture in a range where the image forming apparatus can reproduce is output, and the output chart is measured by a scanner or a colorimeter to compare with a target value, and a correction value is created (for example, refer to Japanese Patent Laid-Open No. 2006-165864). For example, proposed is a color mixture calibration technology in which a destination profile that an ICC profile has is focused on, and a color difference of the color mixture is corrected by modifying the destination profile. The ICC profile is data which is used at the time of color conversion defined by an ICC (International Color Consortium). In this technique, first, the chart created with the color mixture is output by the image forming apparatus, and the created chart is measured by a scanner or a colorimeter. A difference is created using the colorimetric result and the target value, and a three-dimensional LUT (destination profile) is updated which converts into a device-dependent color space (CMYK) a device-independent color space (L*a*b*) that the ICC profile has, and whereby it becomes possible to correct a color of the color mixture. The L*a*b* is one of the color spaces independent of the device, L* represents brightness and a*b* represents a hue and saturation.

In addition, in recent years, provided is a system in which a sensor which detects a density and a color is provided at a paper transport section after a fixing process (post fuser) of the electrophotography system instead of a colorimeter connected to a scanner or an outside to read a chart to be output.

According to the above-described technologies, it has been possible to perform color mixture calibration using the post fuser.

Further, also proposed is a technology in which an image forming apparatus itself having the post fuser sensor mounted therein serves as a measuring instrument, and measures printed matter not only of its own apparatus but of other apparatuses (for example, Japanese Patent Laid-Open No. 2003-107833).

In the technology described in Japanese Patent Laid-Open No. 2003-107833, first, the image forming apparatus feeds a measuring image data printed matter of the other apparatus to a printing paper transport path of its own apparatus, and transfers it in a state where electrophotographic process processing is turned off. A density and a color are then measured by the post fuser sensor, and reference data is obtained. After that, the electrophotographic process is turned on, and a same image data is printed from its own apparatus. Similar measurement is performed by the post fuser sensor in this printing process, and a table which corrects a difference with the reference data is generated. The image forming apparatus matches gradation property thereof to gradation property of the other image forming apparatus by application of the above. In addition, it is assumed that calibration in the other apparatus is performed by using a correction table generated as described above.

However, since an ability and a setting for achieving calibration depend on an individual model, calibration has been achieved only in a combination of instruments in which various settings had been previously optimized.

For example, performance of a sensor mounted in each model of the image forming apparatus having a post fuser sensor mounted therein may be different from each other. This is because there exist various types of post fuser sensors in respect of cost or performance depending on variety of a semiconductor manufacturing process technology or an electronic circuit technology which are used for the sensor. For example, it is assumed that models which mount a number of post fuser sensors and models which can mount only a small number of post fuser sensors mixedly exist in the market. In addition, it is assumed that models in which a length of patch data which the sensor can read may be short or must be long depending on the performance of the sensor also mixedly exist in the market.

Further, there is an image forming apparatus which achieves a color mixture calibration function in a 4D-LUT which outputs a new CMYK combination from four input signals of CMYK. However, it is assumed that models having different formats of the number of data entries, a bit depth at the time of data holding of the 4D-LUT, etc. mixedly exist in the market.

The above is individually optimized in the individual model. Accordingly, there is a case where a trouble occurs when instruments are combined so that a chart optimized and printed for a certain model is measured by another model having a post fuser sensor mounted therein. For example, there is a case where mismatch among instruments, such as misalignment of a patch location and a sensor location on the chart, occurs, and thus color mixture calibration is not established.

As described above, there has been a problem that cannot be performed color mixture calibration by cooperation among instruments with respect to an arbitrary combination of the instruments.

SUMMARY OF THE INVENTION

The present invention is an image forming apparatus capable of communicating with an other image forming apparatus having at least one sensor which measures a color, and the image forming apparatus includes: an obtaining unit configured to obtain measuring instrument information on measurement of the color in the other image forming apparatus; a chart image generation unit configured to generate a chart image using the measuring instrument information obtained by the obtaining unit; a transmission unit configured to transmit measurement chart information including conditions for measuring the chart image generated by the chart image generation unit to the other image forming apparatus; a reception unit configured to receive data which is obtained from the measurement result of the chart image in the other image forming apparatus using the measurement chart information transmitted by the transmission unit, and which is transmitted from the other image forming apparatus, the data being for correcting a color reproduction characteristic; and an image forming unit configured to form an image using the data received by the reception unit.

According to the present invention, it becomes possible to achieve calibration to an image forming apparatus not having a measuring sensor by arbitrarily combining the image forming apparatus not having the measuring sensor and an image forming apparatus having the measuring sensor.

Further features of the present invention will become apparent from the following description of exemplary embodiments (with reference to the attached drawings).

BRIEF DESCRIPTION OF THE DRAWINGS

FIG. 6 is a table showing an example of internal data of a 4D-LUT according to the embodiment;

FIG. 9 is a table showing an example of internal data of measuring instrument information according to the embodiment;

FIG. 10 is a table showing an example of internal data of measurement chart information according to the embodiment;

DESCRIPTION OF THE EMBODIMENTS

Hereinafter, embodiments of the present invention will be described using drawings.

<Embodiment 1>

A summary of the embodiment will be described. In the embodiment, first, a color printer (an image forming apparatus) not mounting a post fuser sensor obtains measuring instrument information of a color printer (an image forming apparatus) mounting a post fuser sensor. Hereinafter, unless particularly clearly indicated, the color printer not mounting the post fuser sensor is simply referred to as a color printer, and the color printer mounting the post fuser sensor is referred to as a measuring printer. In addition, the post fuser sensor is provided at a paper transport section after a fixing process (post fuser) of the image forming apparatus. Namely, the post fuser sensor is set between a fuser and a paper ejection section of the paper transport section. Detected are a density of patch data, brightness, a value of a color space independent of a device, such as L*a*b* and XYZ, a reflectance, etc.

Next, the color printer prints a chart of a patch arrangement most suitable for measurement by the measuring printer, and transmits measurement chart information used in printing to the measuring printer. Subsequently, the measuring printer measures a color of the chart output by the color printer with the post fuser sensor, and generates as a measurement result a 4D-LUT which is a correction table in which a color reproduction characteristic is corrected. Lastly, the color printer obtains the 4D-LUT, and uses it for output color correction.

[Color Printer Configuration]

Figure 1:
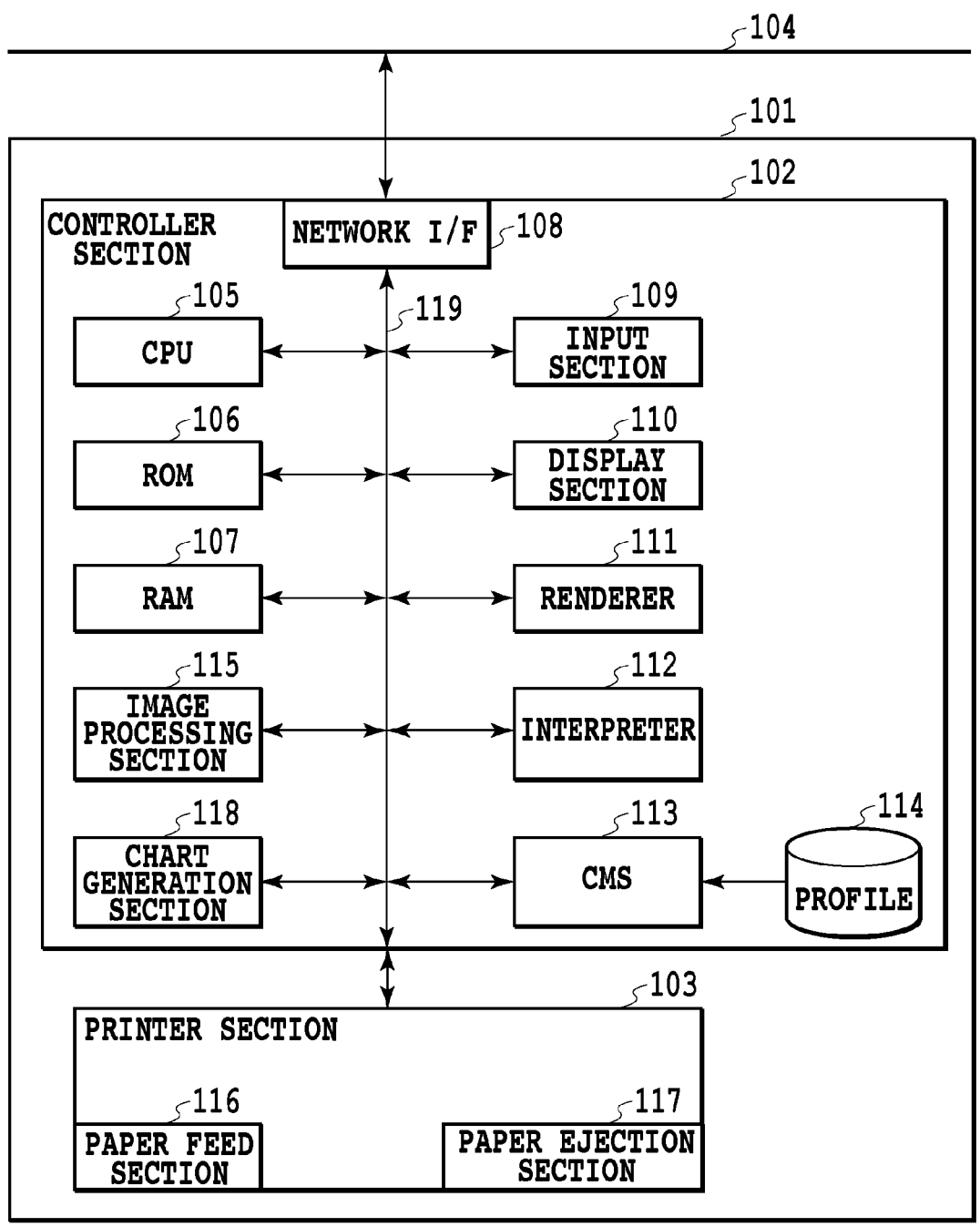
FIG. 1 is a diagram showing an example of a system configuration of an image forming apparatus without a post fuser sensor according to an embodiment.

FIG. 1 is a diagram showing a color printer 101 in the embodiment. Namely, FIG. 1 is a diagram showing an example of an image forming apparatus not mounting a post fuser sensor. The color printer 101 includes a controller section 102 and a printer section 103.

The controller section 102 is configured such that various modules, such as a CPU 105, are connected through a data bus 119 as shown in FIG. 1. A RAM 107 loads program data stored in a ROM 106, and stores it temporarily. The CPU 105 issues commands to the various modules according to the program loaded into the RAM 107, and thereby makes the color printer 101 operate. In addition, data etc. which are generated in each module executing the command are also temporarily stored in the RAM 107.

A network I/F 108 is an interface module with an external network 104. For example, the color printer 101 performs bidirectional data communication, such as reception of print data and measuring instrument information which will be described hereinafter from other devices, and transmission of measurement chart information to other devices through a network 104, based on communication protocols, such as Ethernet (registered trademark).

An interpreter 112 interprets a PDL (Page Description Language) portion of the received print data to generate intermediate language data. Subsequently, a CMS (Color Management System) 113 performs color conversion of the intermediate language data using a profile 114 stored in the ROM 106, and generates post CMS intermediate language data. The CMS 113 performs color conversion as follows.

The profile 114 includes a source profile and a destination profile which are not shown. The source profile is the profile for converting a color space dependent on a PDL data input device, such as RGB and CMYK, into a color space independent of a device, such as L*a*b* and XYZ. XYZ is one of a uniform color space independent of the device enacted by CIE (Commission Internationale de l'Eclairage) similarly to L*a*b*, and represents a color with three types of stimulus values. The destination profile is the profile for converting the color space independent of the device into an RGB or a CMYK color space dependent on an output device (the color printer 101 in the example). Color conversion in the source profile and the destination profile is carried out to thereby convert into the color space of the output device from the color space of the input device.

A renderer 111 generates a raster image from the post CMS intermediate language data. An image processing section 115 performs image processing on the raster image.

A display section 110 is the section for displaying a UI (User Interface) screen indicating an instruction to a user or a state of the color printer 101. An input section 109 is an interface for receiving input from the user.

A chart generation section 118 determines a paper size used for color mixture calibration based on measuring instrument information which will be described hereinafter, and has a function to generate a patch data image (chart image). Detailed operations of the chart generation section 118 will be mentioned later.

The printer section 103 connected to the controller section 102 is a printer which forms image data on paper using colored toner, such as C, M, Y, and K. The printer section 103 has a paper feed section 116 which performs paper feeding, and the paper ejection section 117 which ejects printed paper.

[Measuring Printer Configuration]

Figure 2:
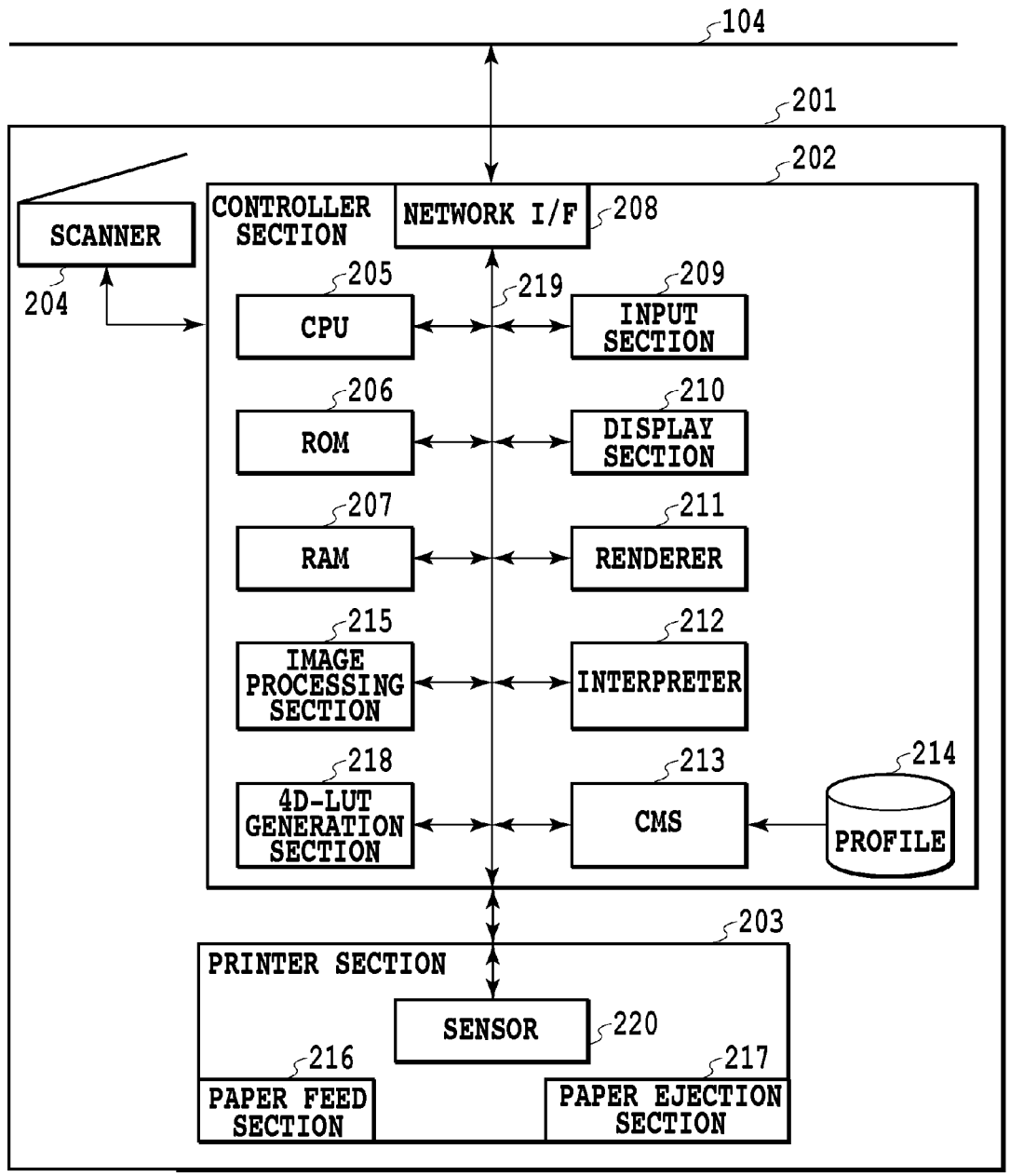
FIG. 2 is a diagram showing an example of a system configuration of an image forming apparatus having the post fuser sensor according to the embodiment.

FIG. 2 is a diagram showing a measuring printer 201 in the embodiment. Namely, FIG. 2 is a diagram showing an example of an image forming apparatus mounting a post fuser sensor. The measuring printer 201 includes a controller section 202 and a printer section 203.

The controller section 202 is configured such that various modules, such as a CPU 205, are connected through a data bus 219 as shown in FIG. 2. A RAM 207 loads program data stored in a ROM 206, and stores it temporarily. The CPU 205 issues commands to the various modules according to the program loaded into the RAM 107, and thereby makes the measuring printer 201 operate. In addition, data etc. which are generated in each module executing the command are also temporarily stored in the RAM 207.

A network I/F 208 is an interface module with the external network 104. For example, the color printer 201 performs bidirectional data communication, such as reception of print data and measurement chart information which will be described hereinafter, and transmission of measuring instrument information, to other instruments through the network 104, based on communication protocols, such as Ethernet (registered trademark).

An interpreter 212 interprets a received PDL portion of the print data to generate intermediate language data. Subsequently, a CMS 213 performs color conversion using a profile 214 stored in the ROM 206, and generates post CMS intermediate language data. The CMS 213 performs color conversion as follows.

The profile 214 includes a source profile and a destination profile which are not shown. Color conversion in the source profile and the destination profile is carried out to thereby convert into a color space of an output device (measuring printer 201) from a color space of an input device.

A renderer 211 generates a raster image from the post CMS intermediate language data. An image processing section 215 performs image processing on the raster image.

A display section 210 is the section for displaying a UI screen indicating an instruction to a user and a state of the measuring printer 201. An input section 209 is an interface for receiving input from the user.

A scanner 204 is the scanner including an automatic document feeder. The scanner 204 irradiates a bundle-shaped or a sheet of document image with a light source which is not shown, and forms with a lens a document reflected image on a solid-state imaging element, such as a CCD (Charge Coupled Device) sensor. The scanner 204 then obtains a raster-like image read signal as image data from the solid-state imaging element.

After the fuser on a paper transport path which is not shown of the printer section 203, exists a sensor 220 which can obtain a value of a color space independent of the devices, such as L*a*b* and XYZ. The sensor 220 reads data output onto paper by the printer section 203, and transmits the read numerical information to the controller section 202. The 4D-LUT generation section 218 of the controller section 202 performs an operation using numerical information read by the sensor 220, and generates correction tables for a single color and a color mixture. It is to be noted that although a case of generating the 4D-LUT is described in the embodiment, the present invention may be configured to be able to generate a 3D-LUT or a 1D-LUT.

[Description of Sensor]

Figure 3:
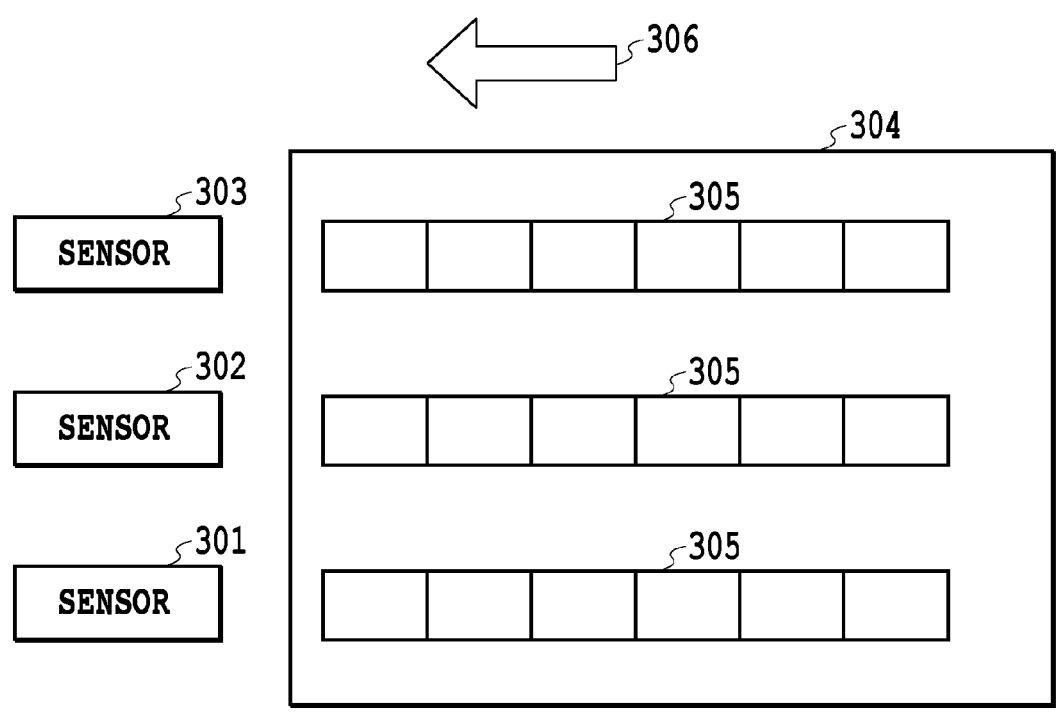
FIG. 3 is a diagram illustrating the post fuser sensor according to the embodiment.

FIG. 3 is a diagram illustrating an arrangement of the sensor 220 including sensors 301 to 303, including a relation with the paper transport path of the measuring printer 201. Since the sensors need to be fixed and arranged on the paper transport path, it is necessary to increase the read data toward a paper transport direction 306 when read data of a chart is increased. Since the data number which can be read from a sheet of paper is insufficient even though the read data is increased toward a paper transport direction 306, it is necessary to increase the number of sensors in a vertical direction to the paper transport direction 306 when read data of a chart is further increased. FIG. 3 shows an example using three sensors, and patch data 305 is arranged on a chart 304 in accordance with positions to which the sensors 301, 302, 303 are fixed. The paper is transported, then, when the different colors of patch data 305 on the chart 304 is passed through each sensor, the printer section 203 obtains a measured value and transmits it to the controller section 202.

[System Diagram]

Figure 18:
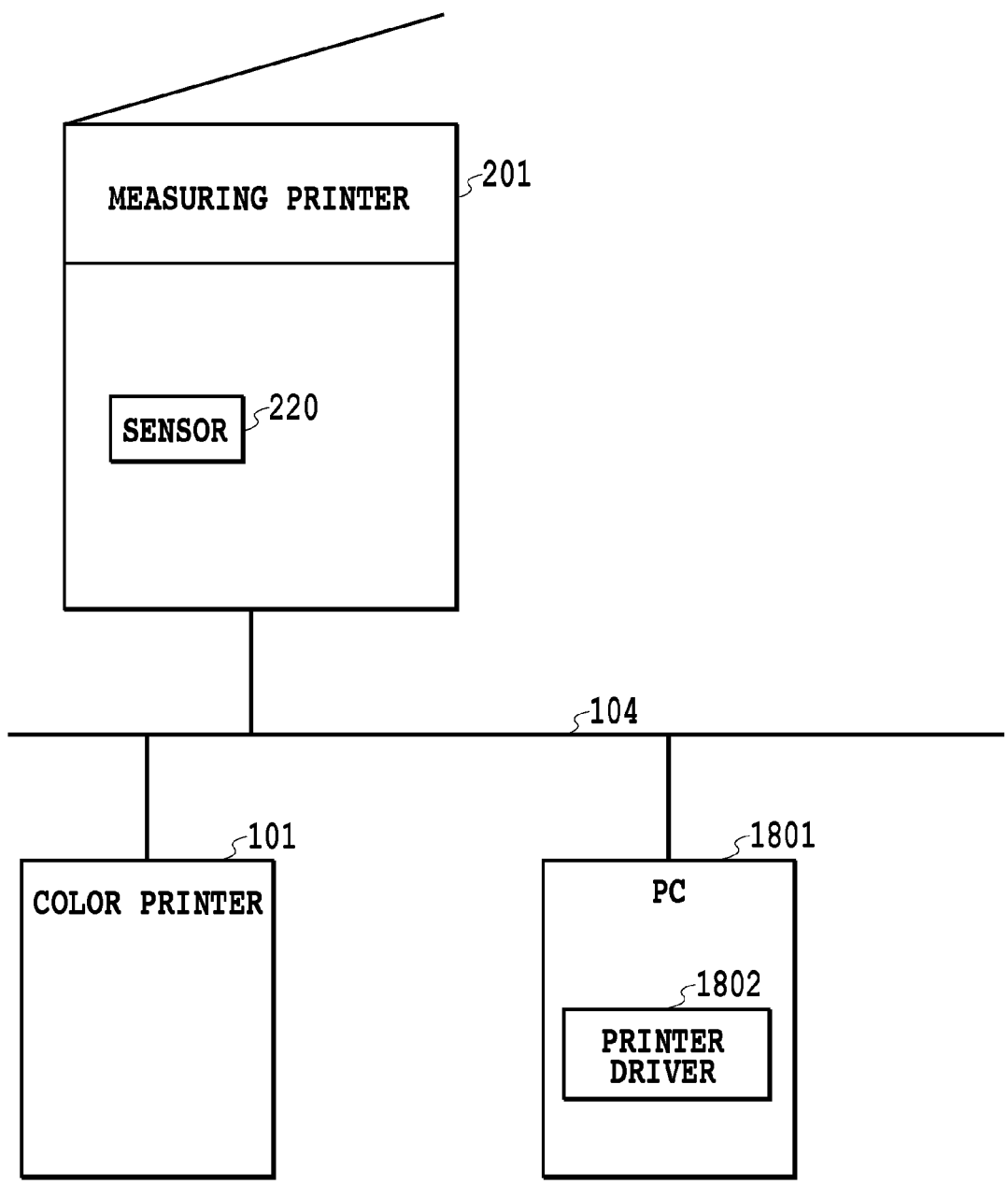
FIG. 18 is a diagram showing one example where each instrument according to the embodiment is network-connected to each other.

FIG. 18 is a diagram showing a state where the color printer 101 and the measuring printer 201 are connected to each other through the network 104. A PC 1801 which is an information processor is connected to the network 104, and a printer driver 1802 which creates print data transmitted to each printer is executed on the PC 1801. Each apparatus is in a state capable of communicating with each other through the network 104. In addition, various color printers, measuring printers, and PCs other than shown apparatuses shall be connected to the network 104.

[Description of Measurement Chart]

Figure 4:
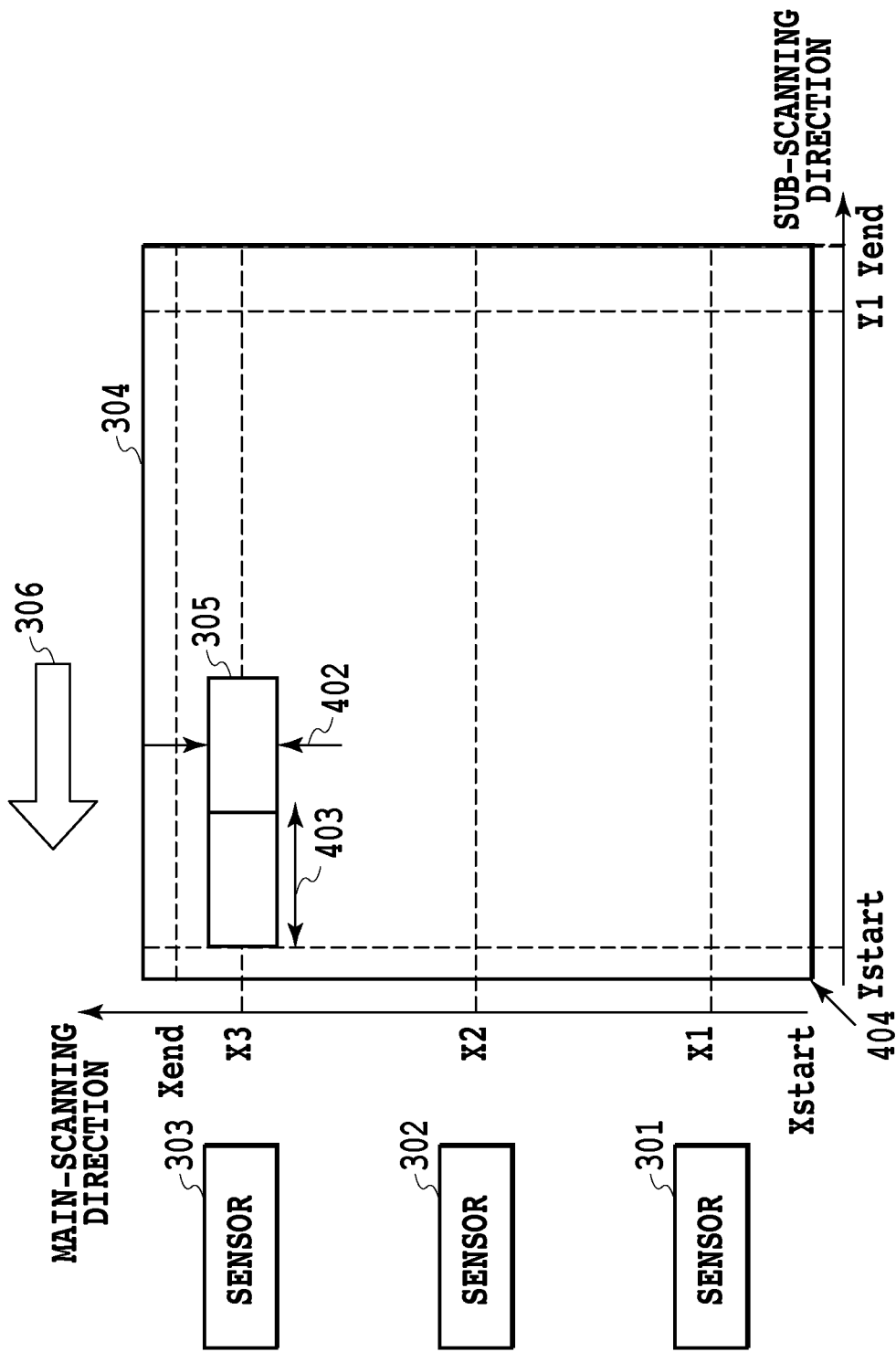
FIG. 4 is a diagram illustrating the post fuser sensor and a chart for color mixture calibration.

FIG. 4 is a diagram illustrating each piece of information on the chart 304 which the sensor 220 can measure. A unit in the description may be the unit indicating a length, such as millimeter and inch, and may be a pixel coordinate in a resolution of digital image data, etc. However, it is necessary to add physical resolution information so as to be able to find a size per pixel in this case. In the description, a measurement chart will be described based on a pixel coordinate in a physical resolution of 600 dpi (dot per inch).

A direction vertical to the paper transport direction 306 is defined as a main-scanning direction, a direction horizontal thereto is a sub-scanning direction, and a starting point 404 is 0pix of a coordinate system. For example, when a size of the paper which the measuring printer 201 can feed through the paper transport path at the time of print operation is an A3 size, the starting point 404 is approximately 7015 pix since a size of the A3 size in the main-scanning direction is approximately 297 mm, and the starting point 404 is approximately 9921 pix since a size of the A3 size in the sub-scanning direction is approximately 420 mm. Consequently, when patch data is arranged on a chart, a start coordinate and a terminal coordinate in a range where the patch data can be arranged in the main-scanning direction can be defined as Xstart=0 pix and Xend=7015 pix, respectively.

Additionally, coordinates on which the sensors 301, 302, and 303 are arranged (i.e., coordinates in the main-scanning direction) can be represented by X1, X2, and X3, respectively. In the embodiment, it is defined that X1=700 pix, X2=3500 pix, and X3=6300 pix.

Each sensor performs measurement within a predetermined sampling time when the chart in which the patch has been arranged passes through. As a result of this, a patch length 403 which can be measured is decided depending on sensor performance or a paper transport speed of the measuring printer. In addition, a patch width 402 needs to be larger than an opening size in the main-scanning direction of a sensor, i.e., an aperture size. Consequently, a patch width sufficient for measurement is also decided by performance of the mounted sensor.

A measurable range which these sensors can measure can be represented using Ystart and Yend which are measurable range coordinates in the sub-scanning direction, and Y1 indicating a margin amount from the Yend. Before measurement sampling is actually performed after an end of the chart 304 is transported to a measuring point of the sensors 301 to 303, a margin may be provided at a tip of the transport direction in some cases. In addition, a terminal portion is also similar to the above. In the embodiment, the measurement chart will be described as Ystart=100 pix, Y1=100 pix, and Yend=9921 pix. In addition, measurable patch sizes, i.e., the patch width 402 and the patch length 403, will be described as 200 pix and 600 pix, respectively.

A portion surrounded by these Xstart, Xend, Ystart, and Yend indicates a measurable range 401 of the measuring printer 201.

[Description of Image Processing Section]

Figure 5:
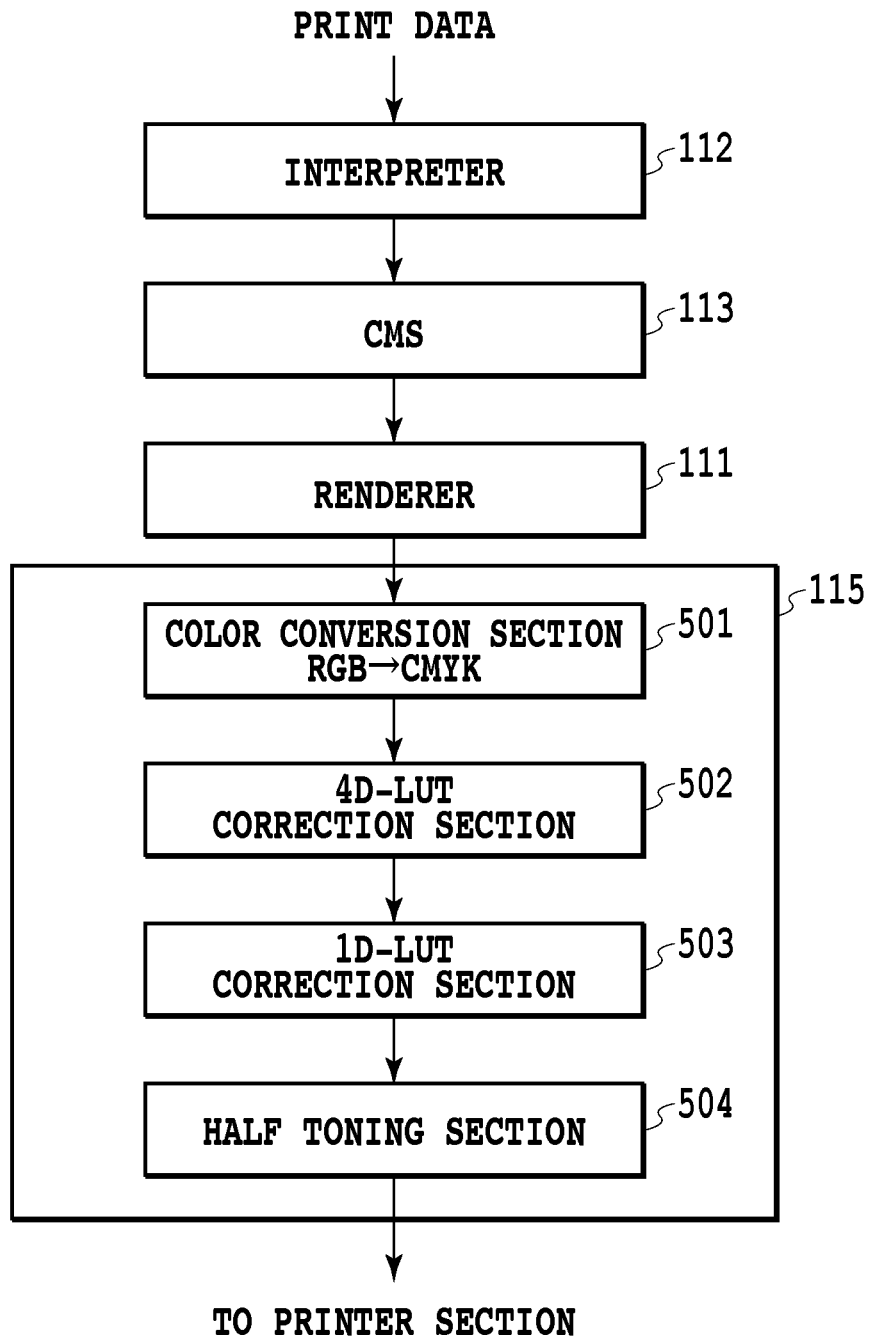
FIG. 5 is a diagram illustrating an image processing configuration of each image forming apparatus according to the embodiment.

FIG. 5 is a diagram illustrating the image processing section 115 of the color printer 101. If print data is input as previously mentioned, a raster image is input into the image processing section 115 after each processing in the interpreter 112, CMS 113, and the renderer 111.

The image processing section 115 includes at least a color conversion section 501, a 4D-LUT correction section 502, a 1D-LUT correction section 503, and a half toning section 504. When the CMS 113 outputs data of an RGB color space dependent on the device, the color conversion section 501 performs color space conversion RGB→CMYK. When the CMS 113 outputs data of a CMYK color space dependent on the device, the color conversion section 501 is skipped. The 4D-LUT correction section 502 carries out color mixture calibration using the 4D-LUT which converts a 4-dimensional input signal of CMYK into an output signal of a combination of C2, M2, Y2, and K2. For example, when the 4D-LUT includes discrete lattice points of 8×8×8×8, the number of lattice points is 4096. When a bit depth of the data is represented by 8 bits (0 to 255), an interval of the lattice points is approximately 36.

It is in FIG. 6 that an example of an input-output relation of the 4D-LUT is shown. FIG. 6 is an LUT in which output C2, M2, Y2, and K2 values are respectively made to correspond to an input CMYK value of each lattice point. When a CMYK value of image data is actually input, the plurality of 4D-LUT lattice points around the input value is selected, a linear interpolation operation is performed from the plurality of selected output signals, and thereby the output C2, M2, Y2, and the K2 values are decided.

After a color of a color mixture is corrected by the 4D-LUT correction section 502, gradation correction of each single color of C2, M2, Y2, and K2 is performed in the 1D-LUT correction section 503 to convert into C3, M3, Y3, and K3, respectively. For example, when an input signal of the 1D-LUT is 8-bit data, it is preferable that the number of entries of the LUT be 256 of 0 to 255. Namely, it is preferable that one output value be stored to all the input values, respectively.

Figure 7A:
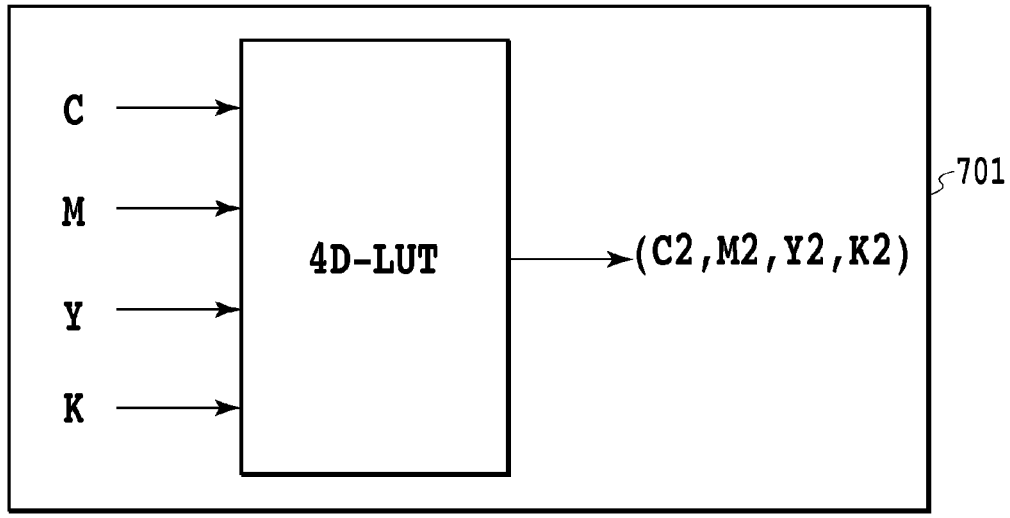
FIG. 7A is a conceptual diagram of the 4D-LUT according to the embodiment.
Figure 7B:
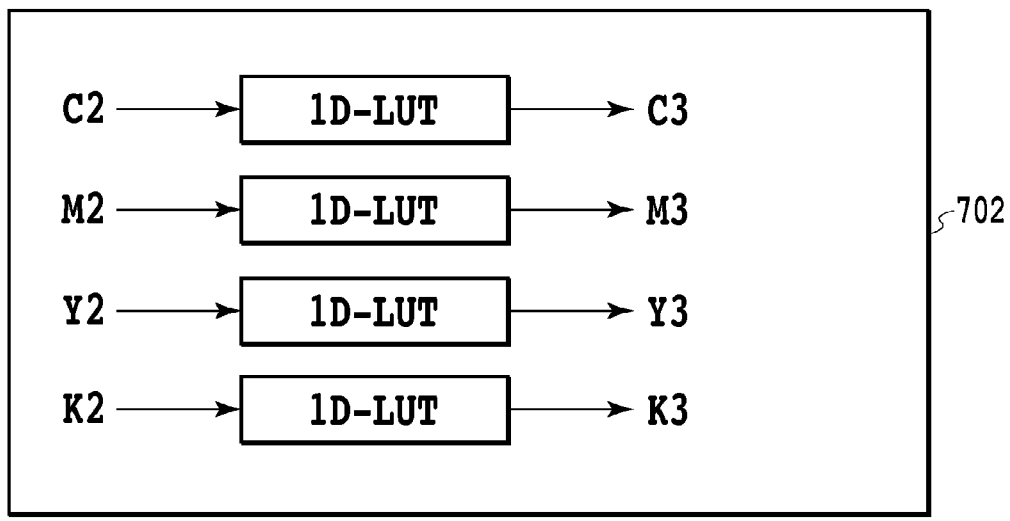
FIG. 7B is a conceptual diagram of a 1D-LUT according to the embodiment.

FIG. 7A shows a schematic diagram of an input-output relation of the 4D-LUT, and FIG. 7B shows a schematic diagram of an input-output relation of the 1D-LUT, respectively. According to the schematic diagram 701 of the 4D-LUT, it can be seen that a mixed color combination of C2, M2, Y2, and K2 is output by one type of 4D-LUT with respect to input of a color mixture which is a combination of CMYK.

According to the schematic diagram 702 of the 1D-LUT, it can be seen that one output is performed with respect to one input. Namely, four 1D-LUTs for C2 input and C3 output, M2 input M3 output, Y2 input Y3 output, and K2 input K3 output independently exist.

Lastly, image formation processing, such as dither screening, is performed on the data of C3, M3, Y3, and K3 in the half toning section 504, and they are printed on paper by the printer 103.

Since the image processing section 215, the renderer 211, the interpreter 212, and the CMS 213 of the measuring printer 201 also perform operation similar in the above-described color printer 101, a description thereof will be omitted.

[Description of Color Printer Operation]

Figure 8:
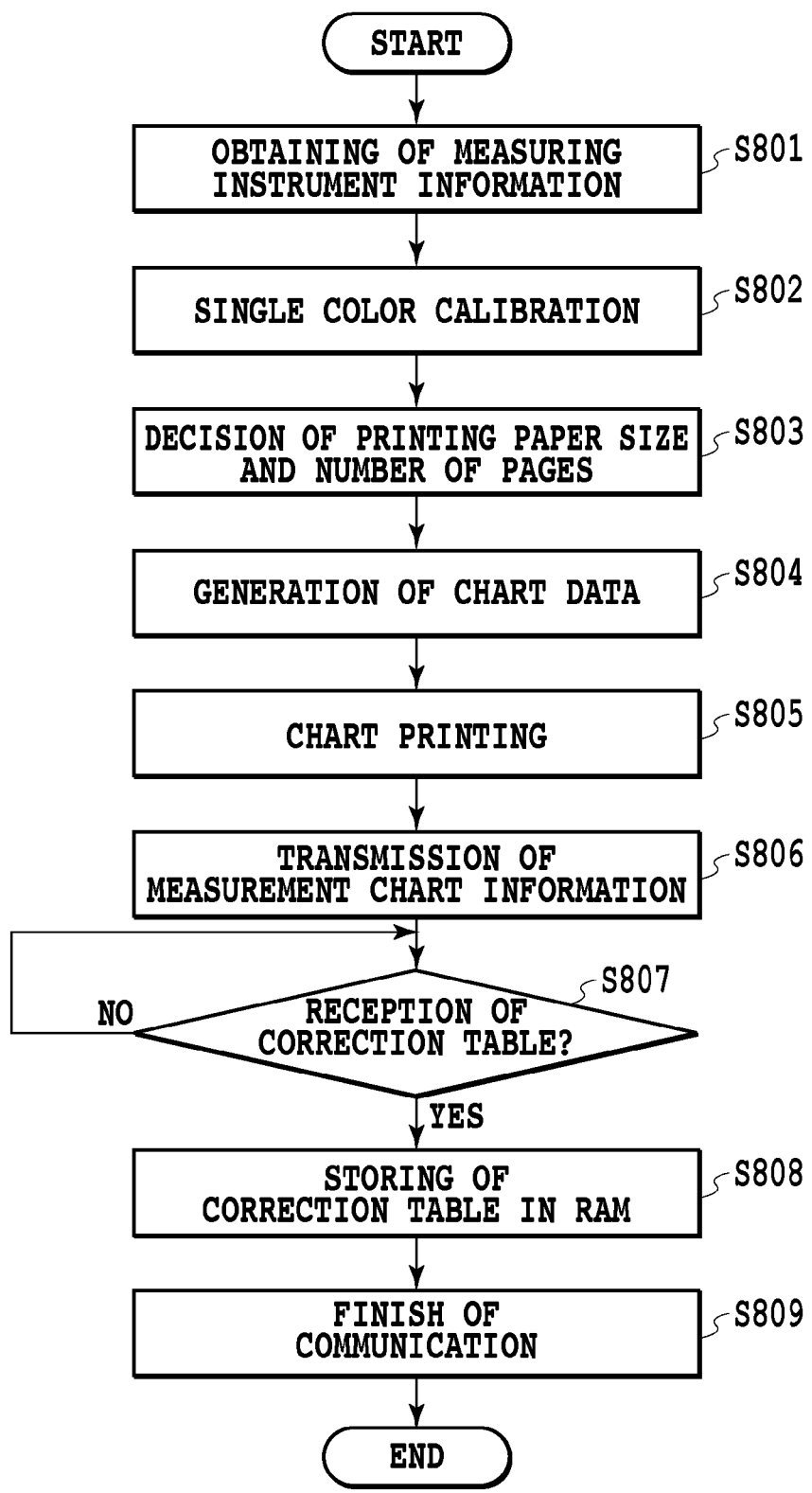
FIG. 8 is a flow chart showing one example of an operation flowchart of the image forming apparatus without the post fuser sensor according to the embodiment.

Operation of the above-mentioned color printer 101 will be described using a flow chart of FIG. 8. Note that it is defined in the description that the display section 110 is an LCD (Liquid Crystal Display) of a touch panel system, and that it plays a role in a part of the input section 109. The input section 109 may have a hard key other than the above. It is to be noted that a flow chart shown hereinafter is executed by the CPU 105 executing a program loaded into the RAM 107 of the color printer 101.

After the measuring printer 201 performs communication negotiation for color mixture calibration with the color printers 101 through the network 104, operation of the color printer 101 starts.

The color printer 101 obtains measuring instrument information shown in FIG. 9 from the measuring printer 201 through the network 104, and stores it in the RAM 107 (step S801).

Information, such as the number of sensors, a sensor location coordinate, a measurable range, a patch length, and a patch width, is included in the measuring instrument information. In addition, attendant information, such as respective units of the sensor location or the measurable range, and an instrument-specific number, etc., maybe included in the measuring instrument information.

Next, a gradation characteristic of each color of C, M, Y, and K is measured by a sensor not shown which detects a density, the sensor being located on a photoconductive drum or a primary transfer belt, and a 1D-LUT is created (step S802). Since a creation method of the 1D-LUT is a well-known technology; a description thereof will be omitted.

The chart generation section 118 loads from the RAM 107 the measuring instrument information obtained in step S801, calculates and decides a paper size of a chart used for color mixture calibration and an arrangement of patch data based on the measuring instrument information, and stores the size and the arrangement in the RAM 107 (step S803).

An operation of step S803 will be described, taking as an example the chart 304 of FIG. 4 and the measuring instrument information of FIG. 9. It is to be noted that numerical values having exemplified at a point describing the chart 304 of FIG. 4 are included in the measuring instrument information shown in FIG. 9.

The chart generation section 118 calculates and decides a printing paper size based on information indicating a measurable range. For example, the chart generation section 118 can calculate that a paper maximum width in the main-scanning direction of the measuring printer is approximately 297 mm from information indicating information and a unit of Xstart and Xend. In addition, from the information on Ystart and Yend, the chart generation section 118 can calculate that patch data can be printed to a position of 9821 pix on the paper to 9921 pix in a transport direction of the measuring printer.

First, a main-scanning direction will be described. From FIG. 4, it can be calculated that a distance between ends of the patch data which can be measured by the sensors 301 and 303 is 5800 pix. Specifically, first, an interval between a sensor location X1=700 pix and a sensor location X3=6300 pix is 5600 pix. Additionally, since further a patch width is 200 pix, and every 100 pix is required from aperture centers of the sensors, respectively, it can be calculated that a total of 5800 pix=approximately 245 mm and thus, required is paper having a side of a main-scanning direction length not less than the above and a paper maximum width within approximately 297 mm. For example, in a case of A type and B type of regular size paper, a shorter side (approximately 297 mm) of A3, a long side (approximately 297 mm) of A4, and a shorter side (approximately 257 mm) of B4, and a long side (approximately 257 mm) of B5 correspond to the above-described paper.

All the above-described A3, A4, B4, and B5 fall in a range of a length calculated from Ystart and Yend in a sub-scanning direction. Eventually, A3, A4, B4, and B5 are decided as a paper candidate. It is preferable to select paper having the longest side in the sub-scanning direction from among the paper candidates of the papers stacked on the color printer 101. This is because the number of papers used for color mixture calibration can be reduced when the patch data is printed as much as possible in the sub-scanning direction of the chart 304 of FIG. 4.

In the embodiment, continued to be described a case where A4 paper is stacked on the color printer 101 among the above-described paper candidates.

When the long side of A4 paper is set to be the main-scanning direction of the chart 304 of FIG. 4, the A4 paper has a paper region of approximately 210 mm=approximately 4960 pix in the sub-scanning direction. Namely, since a margin of Y1=100 pix is required for a rear end portion, when margins of Ystart of a paper tip and Y1 of a paper rear end are excepted, it is calculated that the A4 paper has a patch data region of 4760 pix.

Since a patch length=600 pix from the measuring instrument information of FIG. 9, it is calculated that 7 patches can be arranged in the sub-scanning direction.

As described above, it is calculated that 7 patches×3 sensors=21 patches can be arranged in a sheet of A4 paper. For example, if the number of pieces of patch data required for color mixture calibration is 100, it can be derived that five sheets of A4 paper are required.

It is to be noted that the number of pieces of patch data required for color mixture calibration may differ depending on a model of a color printer.

In addition, although the example using the paper size including a measurable range size has been described in the above-described example, paper smaller than the measurable range size may be used. Since paper is transported mainly to a center of the main-scanning direction when paper smaller than a paper maximum width is selected, when patch data is arranged, a coordinate system may be offset only by a half of a difference between a selected paper width and a maximum paper width.

The chart generation section 118 reads a printing paper size derived in step S803, a patch size obtained in step S801, and a patch data value stored in the ROM 106. Subsequently, chart image data for color mixture calibration is generated based on the above, and it is stored in the RAM 107 for each page (step S804: chart image generation processing).

The CPU 105 calls the chart image data for calibration stored in the RAM 107, and inputs it into the image processing section 115. Subsequently, the image processing section 115 skips the color conversion section 501 and the 4D-LUT correction section 502 of FIG. 5, executes processing of the 1D-LUT correction section 503 and the half toning section 504, and prints the processed chart image data by the printer 103. At this time, the LUT generated in step S802 is used in the 1D-LUT correction section (step S805).

Figure 11A:
FIGS. 11A to 11C are diagrams showing UI display examples in the image forming apparatus without the post fuser sensor according to the embodiment.

During an print operation in step S805, information indicating that the chart is being printed is displayed on the display section 110 as shown in FIG. 11A so that the other processing is not to be executed.

If printing in step S805 is finished, the CPU 105 reads the paper size of the chart which is decided in step S803 and stored in the RAM. In addition, the CPU 105 reads 4D-LUT information, correction target information, a 3D-LUT of CMY→L*a*b, and a 3D-LUT of L*a*b*→CMY which are stored in the ROM 106. The CPU 105 transmits the above-described read data as measurement chart information to the measuring printer 201 through the network I/F 108 and the network 104 (step S806).

FIG. 10 shows one example of measurement chart information. This measurement chart information includes at least: a paper size of a chart; the number of charts; the number of pieces of patch data per sheet; the number of lattice points of the 4D-LUT; a data bit depth of LUT data; a correction target color value with respect to each patch data; and a maximum color material application amount.

It is to be noted that there is a case where a fraction may be left depending on the number of pieces of patch data, and that pages may not be printed by the above-described number of pieces of patch data per sheet. In this case, it is only necessary to make the correction target color value blank, or to describe a character or a character string which can specify the blank.

It is to be noted that a plurality of 4D-LUTs may be created by one-time color mixture calibration, and that in that case, it is only necessary to add at least the number of 4D-LUTs and the corresponding correction target data to the measurement chart information. In the plurality of 4D-LUTs being created, the number of created 4D-LUTs can be seen from the number of papers and the number of patches which are described in the measurement chart information.

Figure 11B:
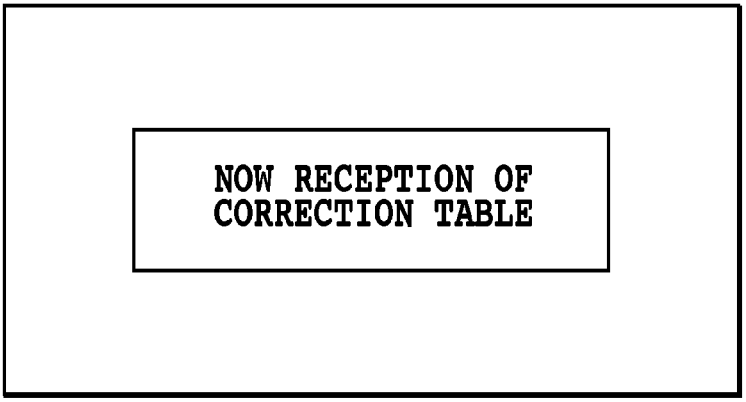

Subsequently, the CPU 105 waits to receive the 4D-LUT from the measuring printer 201 (step S807). At this time, information indicating that the CPU 105 is receiving the 4D-LUT is displayed on the display section 110 as shown in FIG. 11B.

At this time, the chart printed in step S805 is transported by a user to the measuring printer 201, and it is measured by the measuring printer 201.

Figure 11C:
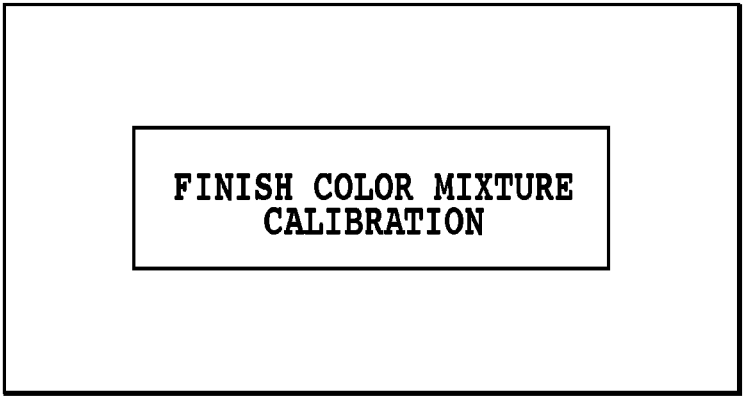

The CPU 105 stores the 4D-LUT received from the measuring printer 201 in the RAM 107 (step S808), and finishes communication with the measuring printer 201 (step S809). At this time, information to see that reception of the 4D-LUT has been completed is displayed on the display section 110 as shown in FIG. 11C.

Hereafter, the image processing section 115 carries out image processing at the time of printing using the 4D-LUT stored in the RAM 107.

[Description of Measuring Printer Operation]

Operation of the above-mentioned measuring printer 201 will be described using a flow chart of FIG. 12. Note that it is defined in the description that the display section 210 is an LCD of a touch panel system, and that it plays a role in apart of the input section 209. The input section 209 may have a hard key other than the above.

Figure 13A:
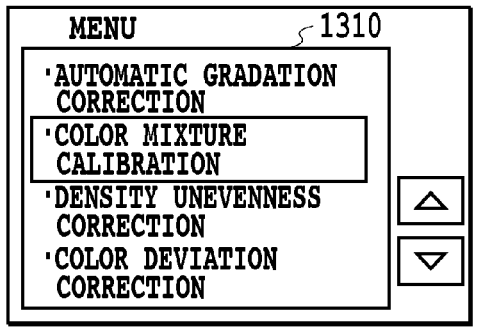
FIGS. 13A to 13G are diagrams showing UI display examples in the image forming apparatus having the post fuser sensor according to the embodiment.
Figure 13D:
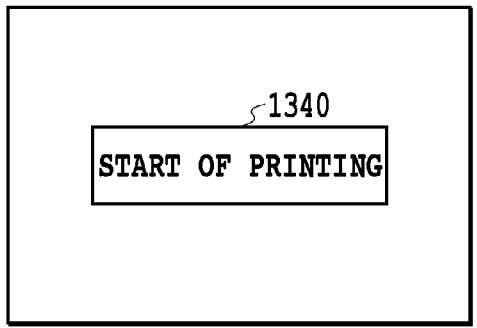
Figure 13B:
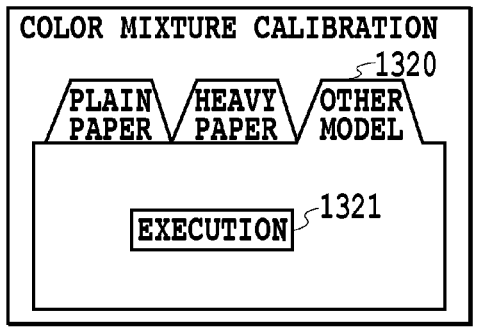

If an operation 1310 of color mixture calibration as shown in FIG. 13A is selected from the input section 209 in the display section 210 of the measuring printer 201, a screen transitions to a screen on which a color mixture calibration operation 1320 of an other model can be selected as shown in FIG. 13B. If a color mixture calibration execution 1321 of the other model is input in FIG. 13B, a screen transitions to a screen on which the color printer 101 is selected as shown in FIG. 13C.

Figure 13E:
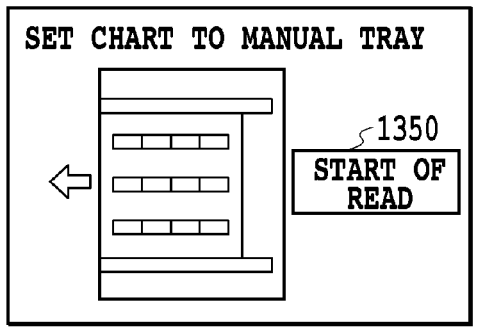
Figure 13C:
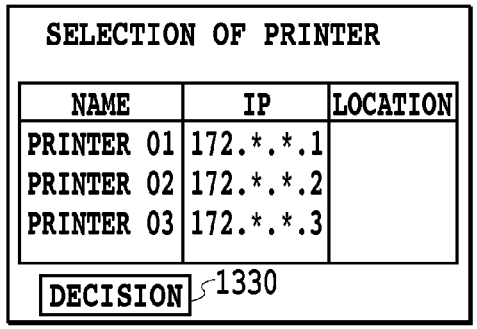
Figure 13F:
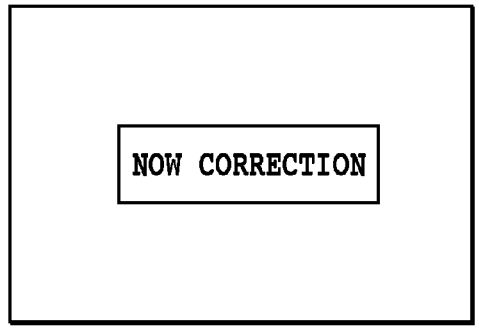
Figure 13G:

In FIG. 13C, displayed is a list of color printers which are previously registered with the measuring printer 201, or which has executed color mixture calibration of the other model in the past, the color printers being connectable with each other through the network 104. The list includes specific names attached to each printer, address information which can specify a color printer, such as an IP address, installation location information of other color printers, etc.

A user selects a model corresponding to the color printer 101 on the screen of FIG. 13C, and presses a decision button 1330 to fix execution of color mixture calibration of the color printer 101 (step S1201).

The CPU 205 starts communication with the color printer 101 selected in step S1201 through the network I/F 208 and the network 104, and the display section 210 displays a print start key 1340 for inputting start of chart printing as shown in FIG. 13D. If the print start key 1340 is pressed, a command of print start is transmitted to the color printer 101 (step S1202).

The CPU 205 reads the measuring instrument information described in FIG. 9 from the ROM 206, and transmits it to the color printer 101 (step S1203: measuring instrument information transmission processing).

The CPU 205 waits to receive measurement chart information from the color printer 101. If the CPU 205 receives the measurement chart information, it stores the measurement chart information in the RAM 207 (step S1204: measurement chart information reception processing).

Subsequently, the display section 210 displays an input waiting screen for chart read from the paper feed section 216 as shown in FIG. 13E, and the CPU 205 waits chart read (step S1205).

The charts printed by the color printer 101 are stacked on the paper feed section 216 by the user. Subsequently, if a read start key 1350 is pressed in step S1205, the CPU 205 controls the printer section 203 so as to feed the above-described charts one by one from the paper feed section 216 of the printer section 203.

Subsequently, the printer section 203 feeds the charts, and transports the above-described charts through the paper transport path through which paper is fed at the time of printing. At this time, all the electrophotographic processes are set to be invalid. Patch data printed on the chart is measured by the sensor 220 to obtain a color value in synchronization with reach of the above-described chart to the sensor 220. At this time, the sensor 220 measures the patch data based on paper size information and the number of pieces of patch data per sheet in the measurement chart information stored in the RAM 207. The color value measured as described above is stored in the RAM 207. This operation is repeated by the number information of the charts of the measurement chart information stored in the RAM 207. Subsequently, the display section 210 displays a screen indicating that the 4D-LUT is being created as shown in FIG. 13D. Here, in reading the plurality of charts, the printer section 203 may feed the charts at a same speed as the printing number in the electrophotographic processes, or may feed paper after completing the measurement one by one (step S1206).

If read and measurement of all the charts are finished in step S1206, the 4D-LUT generation section 218 reads the measured value and the measurement chart information which are stored in the RAM 207, and generates a 4D-LUT as a correction table. Subsequently, the 4D-LUT generation section 218 stores the generated 4D-LUT in the RAM 207 (step S1207: correction table generation processing). Namely, the 4D-LUT generation section 218 performs data generation processing which generates data for correcting a color reproduction characteristic of the color printer. It is to be noted that a generation method of the 4D-LUT will be mentioned later.

The CPU 205 reads the 4D-LUT generated in step S1207 from the RAM 207, and transmits the above-described 4D-LUT to the color printer 101 through the network I/F 208 and the network 104 (step S1208: data transmission processing).

If transmission of the 4D-LUT is completed, the CPU 205 finishes communication with the color printer 101 after eliminating the measurement chart information and the 4D-LUT which are stored in the RAM 207, and the display section 210 displays a screen indicating operation finish shown in FIG. 13E (step S1209).

[Creation Method of 4D-LUT]

Figure 15:
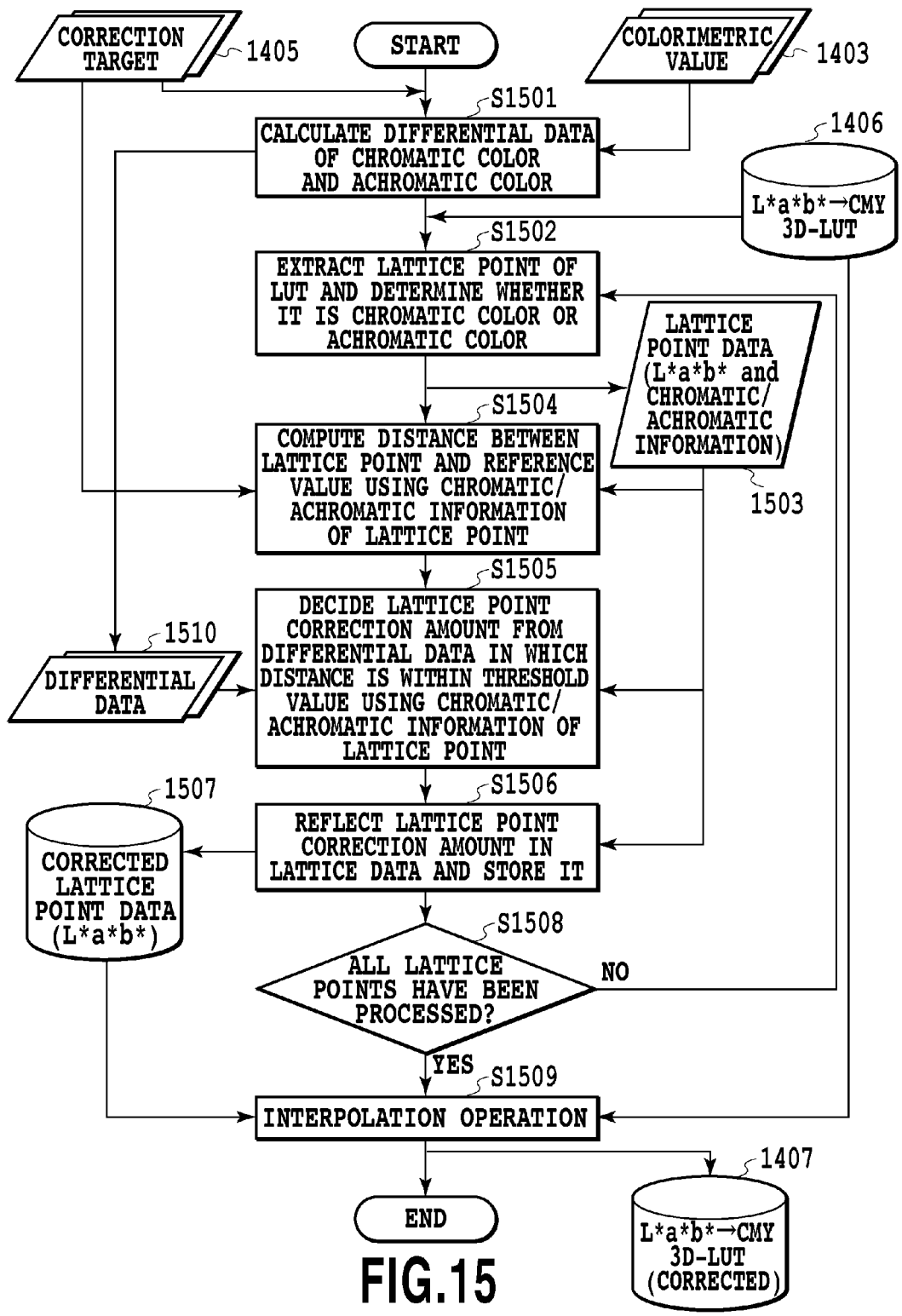
FIG. 15 is a flowchart showing one example of 3D-LUT correction processing at the time of 4D-LUT generation according to the embodiment.
Figure 16:
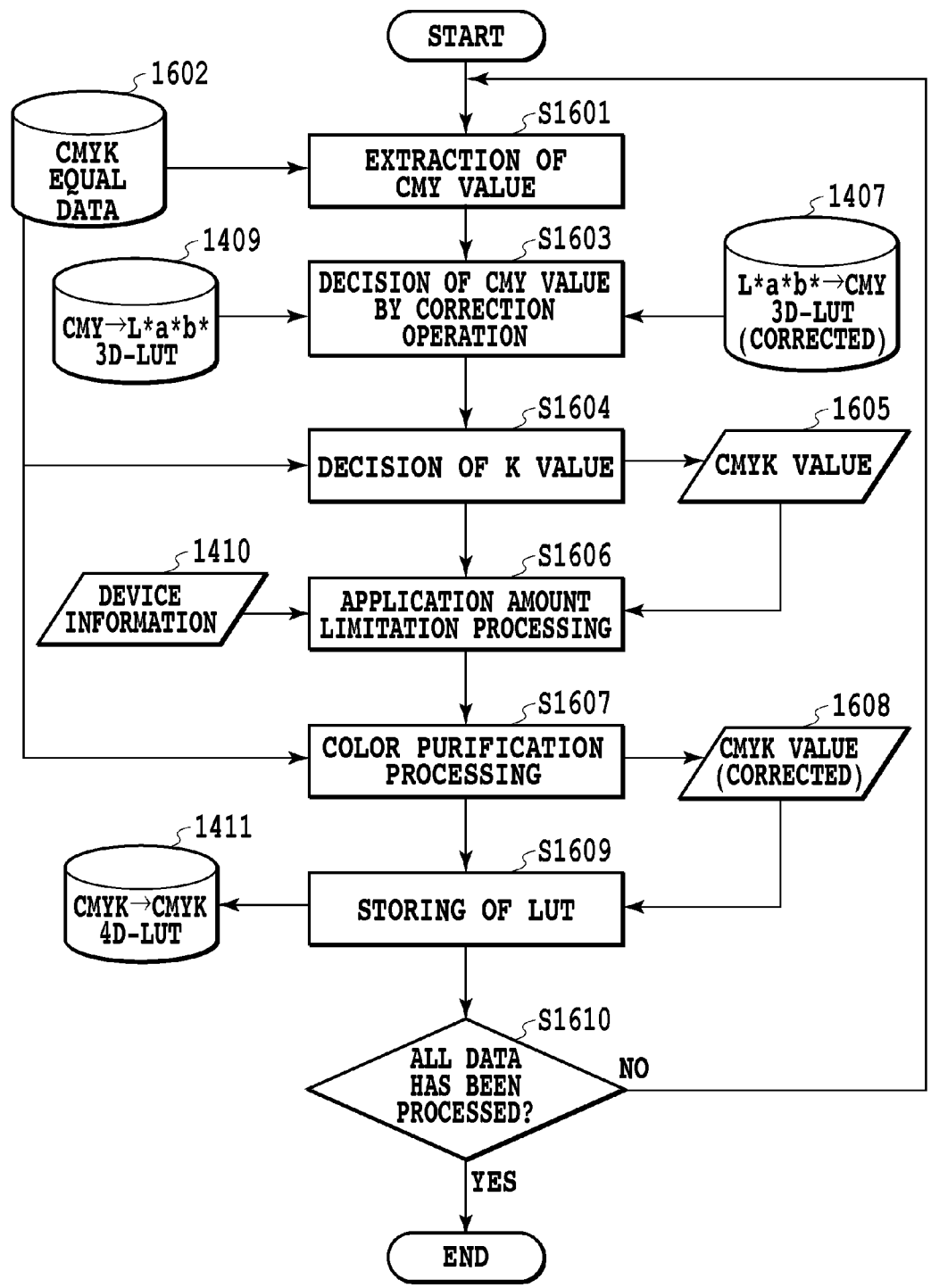
FIG. 16 is a flow chart showing 4D-LUT correction processing at the time of 4D-LUT generation.

Next, a creation method of the 4D-LUT in step S1207 of FIG. 12 will be described using FIGS. 14 to 16. The following processing is performed in accordance with an instruction of the CPU 205 of the controller section 202.

Figure 14:
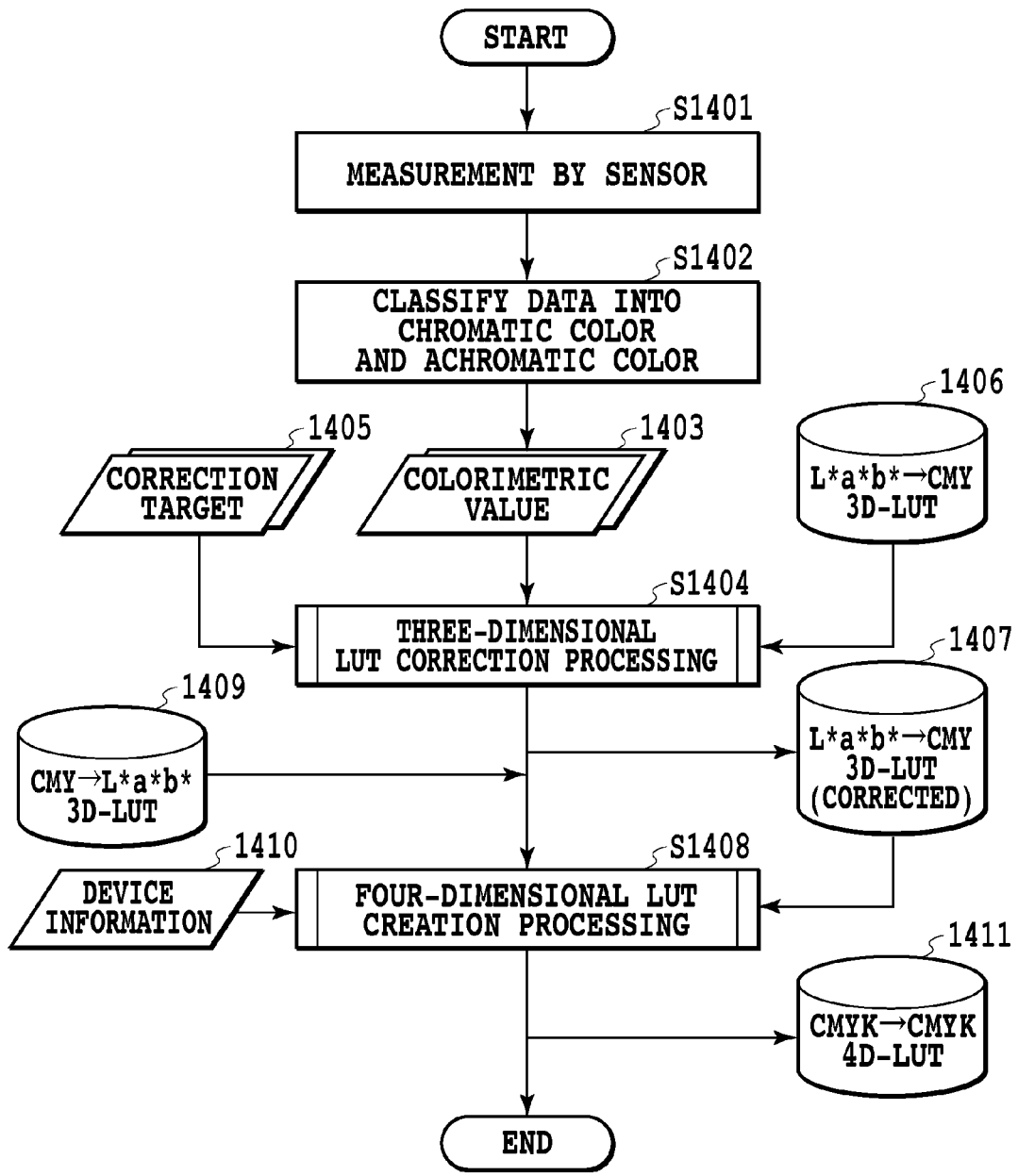
FIG. 14 is a flowchart showing one example of a flow of 4D-LUT generation processing according to the embodiment.

FIG. 14 shows a flow of processing to create the 4D-LUT. In step S1401, the controller section 202 issues the instruction to the sensor 220, and measures the chart 304 using the sensor 220 to obtain an L*a*b* value. Next, in step S1402, the controller section 202 receives the measured patch data, classifies them into a chromatic color and an achromatic color, obtains a colorimetric value 1403, and stores it in the RAM 207. In a classifying method here, information whether the patch data is the chromatic color or the achromatic color may be previously added to the chart 304, or whether the patch data is the chromatic color or the achromatic color may be determined by analyzing numerical values of the patch data or the measured patch data.

Next, the controller section 202 reads from the RAM 207 the colorimetric value 1403, a correction target 1405, and a 3D-LUT 1406 of L*a*b*→CMY. The correction target 1405 and the 3D-LUT 1406 of L*a*b*→CMY are transmitted from the color printer 101 in a state of being included in the measurement chart information. Subsequently, in step S1404, the controller section 202 performs 3D-LUT correction processing, and outputs a 3D-LUT 1407 of L*a*b*→CMY (corrected). The correction processing of the 3D-LUT in step S1404 will be mentioned later. The correction target 1405 means the target L*a*b* value, and it is set in each of the chromatic color and the achromatic color. The 3D-LUT 1406 of L*a*b*→CMY is the LUT for color conversion created using the known technique, and it is data in which described is a CMY value specific to a device corresponding to the L*a*b* value set at a constant interval in a shape of a lattice. The controller section 202 performs an interpolation operation on an arbitrary L*a*b* value to output the CMY value.

Lastly, in step S1408, the controller section 202 creates a 4D-LUT 1411 of CMYK to CMYK using a 3D-LUT 1409 of CMY→L*a*b*, the 3D-LUT 1407 of L*a*b*→CMY (corrected), and device information 1410. The 3D-LUT 1409 of CMY→L*a*b* and the device information 1410 are transmitted from the color printer 101 in a state of being included in the measurement chart information. Creation processing of the 4D-LUT in step S1408 will also be mentioned later. The 3D-LUT 1409 of CMY→L*a*b* is the LUT for color conversion created using the known technique, and it is data in which described is the L*a*b* value corresponding to the CMY value set at a constant interval in a shape of a lattice. The controller section 202 performs an interpolation operation on an arbitrary CMY value to output the L*a*b* value.

Next, details of the 3D-LUT correction processing shown in step S1404 will be described using FIG. 15. First, in step S1501, the controller section 202 calculates differential data 1510 with respect to each of chromatic color data and achromatic color data using the colorimetric value 1403 and the correction target 1405 from the RAM 207. The differential data 1510 is calculated for the number of pieces of patch data, and is classified according to the chromatic color and the achromatic color. Next, in step S1502, the controller section 202 reads the 3D-LUT 1406 of L*a*b*→CMY from the RAM 207, extracts one of lattice point data (L*a*b*), and determines whether the extracted lattice point data is the chromatic color or the achromatic color. An example of a determination method will be described. Since values of a* and b* are data indicating hue/saturation, the controller section 202 determines the lattice point data in which both data indicating hue/saturation is close to 0 to be the achromatic color. Any determination method may be used here, such as setting a threshold value. The determined data corresponds to the lattice point data (L*a*b* and chromatic/achromatic information) 1503. Here, when L* is in a range of 0 to 100, a* and b* are in a range of −128 to 128, respectively, and the number of lattice points is 33×33×33, data of L*a*b* is the data in which L* is increased by approximately three, and in which a* and b* are equally increased by eight. Namely, the lattice point data extracted here is one of 33×33×33=35937 data configured in a range from (L*, a*, b*)=(0, −128, −128) to (L*, a*, b*)=(100, 128, 128). Further, added is information indicating whether the data is the chromatic color or the achromatic color.

Next, in step S1504, the controller section 202 calculates a distance between the lattice point data (L*a*b* and chromatic/achromatic information) 1503 and the correction target 1405. Subsequently, in step S1505, the controller section 202 extracts differential data in which the distance is within a constant threshold value, and decides a correction amount of the lattice point data (L*a*b* and chromatic/achromatic information) 1503 from the differential data. On that occasion, the controller section 202 performs extraction processing with reference to the chromatic/achromatic information of the lattice point data using differential data of the chromatic color when the data is determined to be the chromatic color, and differential data of the achromatic color when determined to be the achromatic color. Here, there is a possibility that the extracted differential data is plural, and near data and far data from the lattice point data (L*a*b* and chromatic/achromatic information) 1503 exist among the plurality of extracted differential data. In order to strengthen an effect of the near differential data, and to weaken an effect of far differential data, the controller section 202 performs weighted addition using the distance computed with respect to the differential data, and can decide a lattice point correction amount. Here, a correction amount when the differential data does not exist within the constant threshold value can be set to 0.

Next, in step S1506, the controller section 202 reflects the lattice point correction amount in the lattice point data (L*a*b* and chromatic/achromatic information) 1503, and stores it as corrected lattice point data (L*a*b*) 1507. Subsequently, in step S1508, the controller section 202 determines whether to perform processing to all the lattice point data, and if processing has not performed, the controller section 202 extracts new lattice point data in step S1502, and processing is repeated. If all the lattice points have been processed, the controller section 202 performs interpolation operation processing in step S1509. If all the lattice points have been processed, the corrected lattice point data (L*a*b*) 1507 for the number of lattice points is created. The controller section 202 calculates a new CMY value by performing an interpolation operation to the data using the 3D-LUT 1406 of L*a*b*→CMY. The controller section 202 stores the CMY value as an output value with respect to original lattice point data, and creates the 3D-LUT 1407 of L*a*b*→CMY (corrected). As described above, it becomes possible to decide correction amounts of much lattice point data using the few number of pieces of data by deciding the correction amount of the lattice point with reference to the differential data within a constant distance from the lattice point. Not only the example of the embodiment, but any technique may be used as long as it is the technique for correcting the 3D-LUT 1406 of L*a*b*→CMY.

Next, processing for creating the 4D-LUT in step S1408 will be described using FIG. 16. First, in step S1601, the controller section 202 extracts a CMY value from CMYK equal data 1602. Here, the number of pieces of CMYK equal data is the same as the number of lattice points of the 4D-LUT 1411 of CMYK→CMYK, and an interval between the CMYK equal data is also the same as an interval between the lattice points of the 4D-LUT 1411 of CMYK→CMYK. For example, when the number of lattice points of the 4D-LUT 1411 of CMYK→CMYK is 8×8×8×8=4096, the number of pieces of CMYK equal data 1602 is 4096. When the data is represented by 8 bits (0 to 255), the interval between the data is approximately 36. Next, in step S1603, the controller section 202 performs an interpolation operation using the 3D-LUT 1409 of CMY→L*a*b* and the 3D-LUT 1407 of L*a*b*→CMY (corrected), and determines a CMY value. First, the controller section 202 executes the interpolation operation using the 3D-LUT 1409 of CMY→L*a*b* from the CMY value extracted in step S1601 to obtain an L*a*b* value. Next, the controller section 202 calculates CMY values by executing the interpolation operation using the 3D-LUT 1407 of L*a*b*→CMY (corrected) from the just calculated L*a*b* value. Next, in step S1604, the controller section 202 extracts a value of K of the CMYK equal data 1602, and creates a CMYK value 1605 by combining the just decided CMY values. The K value extracted here corresponds to the CMY value extracted in step S1601. Subsequently, in step S1606, the controller section 202 performs application amount limitation processing using the device information 1410. Here, the device information 1410 is the information in which a toner amount which the color printer 101 can apply is represented numerically, and it is defined as an "application amount" in the embodiment. For example, in a case of CMYK, when a maximum value of a single color is set to be 100%, a 400% of signal value can be set at the maximum. However, an application amount when the total number of applicable toners is 300% is 300%.

Since the CMYK value 1605 may exceed a specified application amount depending on a combination of the CMYK values, the known UCR processing etc. are performed and then application amount limitation processing is performed. Here, UCR (Under Color Removable) processing is the processing in which toner of CMY is replaced with toner of K. Generally, when black is represented, there exists a technique in which it is represented using an equal amount of CMY and a technique it is represented only by K. When black is represented only by K, there is a merit that an application amount can be reduced although a density becomes low compared with a case where it is represented by CMY. Subsequently, in step S1607, the controller section 202 performs color purification processing, and creates a CMYK value (corrected) 1608. When correction is performed in the 4D-LUT 1411 of CMYK→CMYK, for example, it is an ideal that data of a single color C is output with the single color C. In order to achieve the above, when data is pure color data with reference to the original CMYK equal data 1602, the CMYK value is corrected to pure color data. For example, when a value of M is included in the CMYK value (corrected) 1608 although the CMYK equal data 1602 is the single color C, the value of M is set to 0. Subsequently, in step S1609, the controller section 202 stores the CMYK value (corrected) 1608 in the 4D-LUT 1411 of CMYK→CMYK. Lastly, in step S1610, the controller section 202 determines whether or not all pieces of the CMYK equal data 1602 are processed, and if not all pieces of the data is processed, the controller section 202 extracts the CMY value from the remaining CMYK equal data 1602, and repeats processing. If all pieces of the data is processed, the controller section 202 finishes processing, and the 4D-LUT 1411 of CMYK→CMYK is completed.

Here, as for the number of lattice points of the LUT, any number may be used without limiting the example of the embodiment. Further, may be used an LUT with a special configuration, for example, in which the number of lattice points of C and M differ in the 4D-LUT 1411 of CMYK→CMYK.

[Communication of Color Printer and Measuring Printer]

Figure 17:
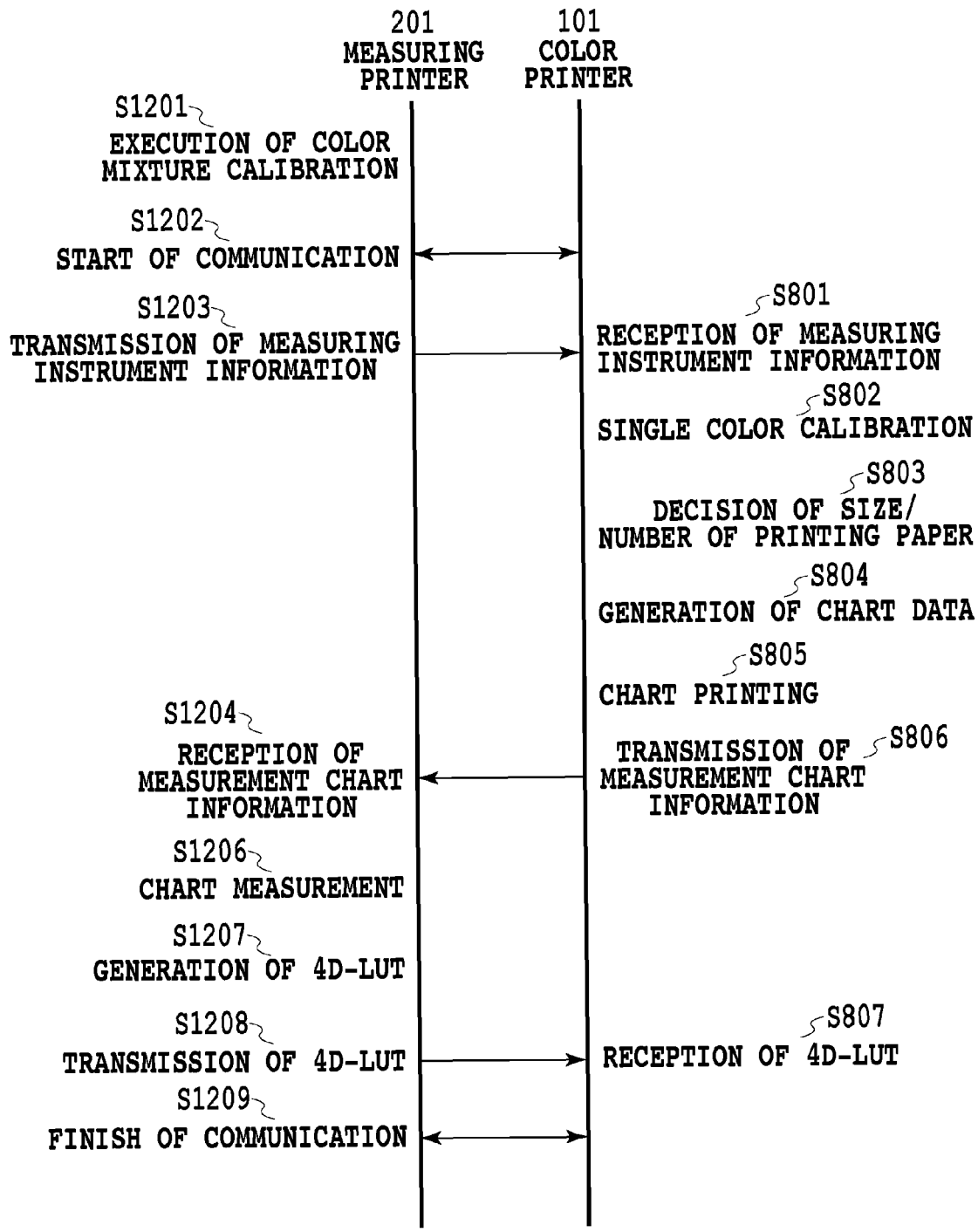
FIG. 17 is a time line diagram showing processing timing of each model according to the embodiment.

FIG. 17 is a diagram showing mutual communication and operations of the color printer 101 and the measuring printer 201 which have been described hereinbefore. Various operations of the color printer 101 and the measuring printer 201 are written, making them correspond to each step in FIG. 8 and FIG. 12.

According to the embodiment described above, it becomes possible that a color printer not having a post fuser sensor flexibly responds to the number of post fuser sensors of a measuring printer having a post fuser sensor, patch data conditions, or paper conditions, and to thereby print a measurement chart. In addition, the 4D-LUT generation section of the measuring printer can flexibly respond to correction tables, such as a 4D-LUT required by the color printer to thereby create the 4D-LUT, thus enabling the color printer to utilize the 4D-LUT. Consequently, the color printer and the measuring printer which mount the configuration shown in the embodiment can provide an effect of color mixture calibration regardless of mutual models.

It is to be noted that although correction of the color printer has been described in the embodiment, the measuring printer may be utilized in order to create a 1D-LUT of a monochrome printer not having a single color calibration function. In this case, the correction target 1405 may just be set to be a density value. In addition, the 4D-LUT generation section 218 may just create the 1D-LUT by a technique similar in a case of single color calibration.

<Embodiment 2>

In the embodiment 2, will be described an example where an execution instruction of color mixture calibration is issued from the color printer 101, and the color mixture calibration is executed using the measuring printer 201.

An LCD used for the display section 110 of the color printer 101 has been increased in size. Since the LCD increased in size can make rich contents displayed to a user, it becomes possible to provide a lot of pieces of information to the user by the LCD. Consequently, there is an advantage that an instruction of a complicated operation also becomes easy to be input.

Figure 19:
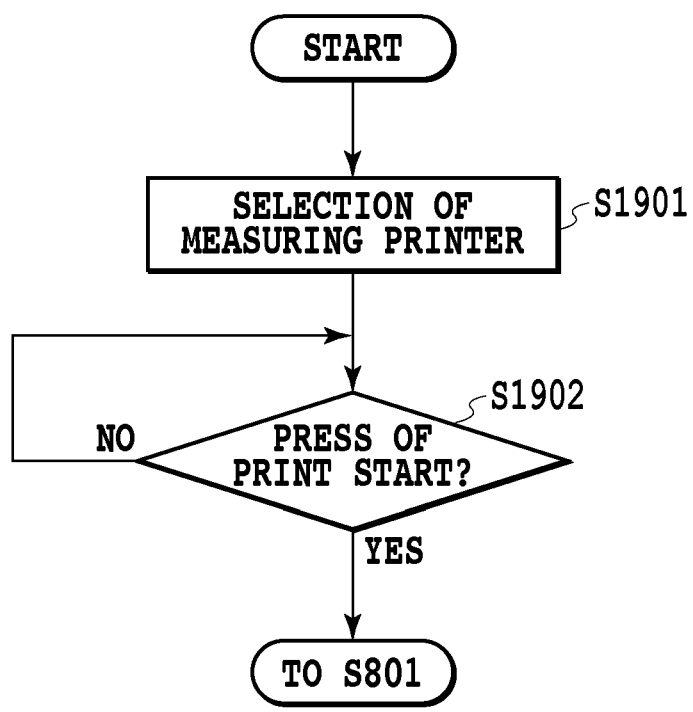
FIG. 19 is a flow chart showing one example of an operation flow chart of an image forming apparatus without a post fuser sensor in an embodiment 2.

FIG. 19 is a flow chart showing one example of operations of the color printer 101 in the embodiment.

Figure 21A:
FIGS. 21A to 21C are diagrams showing UI display examples in the image forming apparatus without the post fuser sensor in the embodiment 2.
Figure 21B:
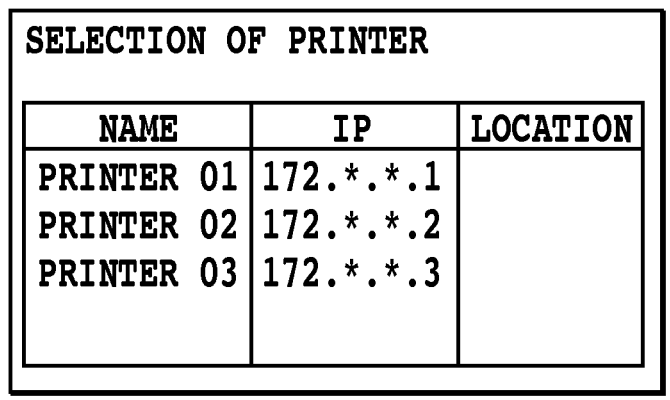

If an operation 2101 of color mixture calibration as shown in FIG. 21A is selected from the input section 109 in the display section 110 of the color printer 101, a screen transitions to a screen on which the measuring printer 201 is selected as shown in FIG. 21B. In FIG. 21B, displayed is a list of measuring printers which are previously registered with the color printer 101, or which has executed color mixture calibration in the past, the measuring printers being connectable with each other through the network 104. The screen includes specific names attached to each measuring printer, address information which can specify a measuring printer, such as an IP address, installation location information of the other measuring printers, etc.

A user selects a model corresponding to the measuring printer 201 from among printers displayed in FIG. 21B, and pushes a decision button of the input section 109 which is not shown to fix execution of color mixture calibration of the color printer 101 (step S1901).

Figure 21C:
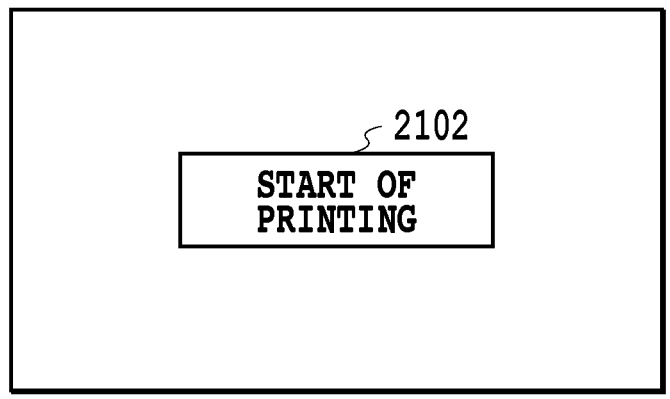

The CPU 105 starts communication with the measuring printer 201 selected in step S1901 through the network I/F 108 and the network 104. The display section 110 displays a print start key 2102 for inputting start of chart printing as shown in the FIG. 21C to be in an input waiting state. In addition, a command which requests measuring instrument information is transmitted to the measuring printer (step S1902). When a command of print start is input in step S1902, the process proceeds to step S801 of FIG. 8.

Figure 20:
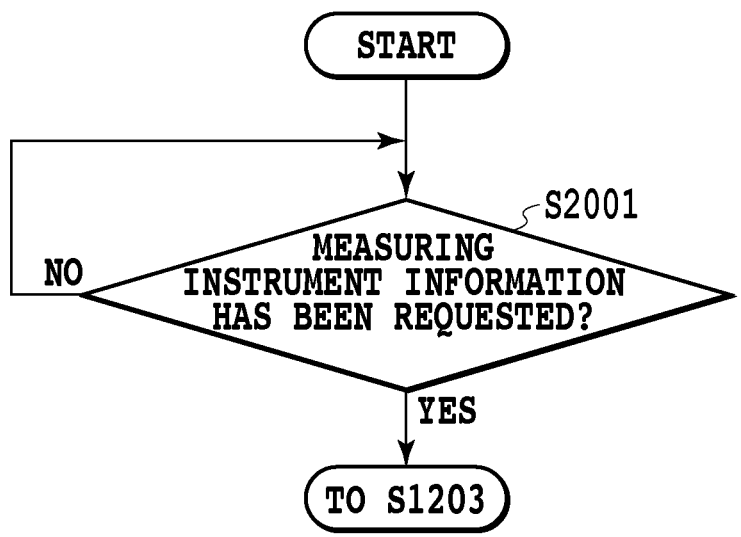
FIG. 20 is a flow chart showing one example of an operation flow chart of an image forming apparatus having the post fuser sensor in the embodiment 2.

FIG. 20 is a flow chart showing operation of the measuring printer 201 in the embodiment. The CPU 205 waits for a request of measuring instrument information after starting communication with the color printer 101 (step S2001). When the request of measuring instrument information is received in step S2001, the process proceeds to step S1203 of FIG. 12.

Figure 22:
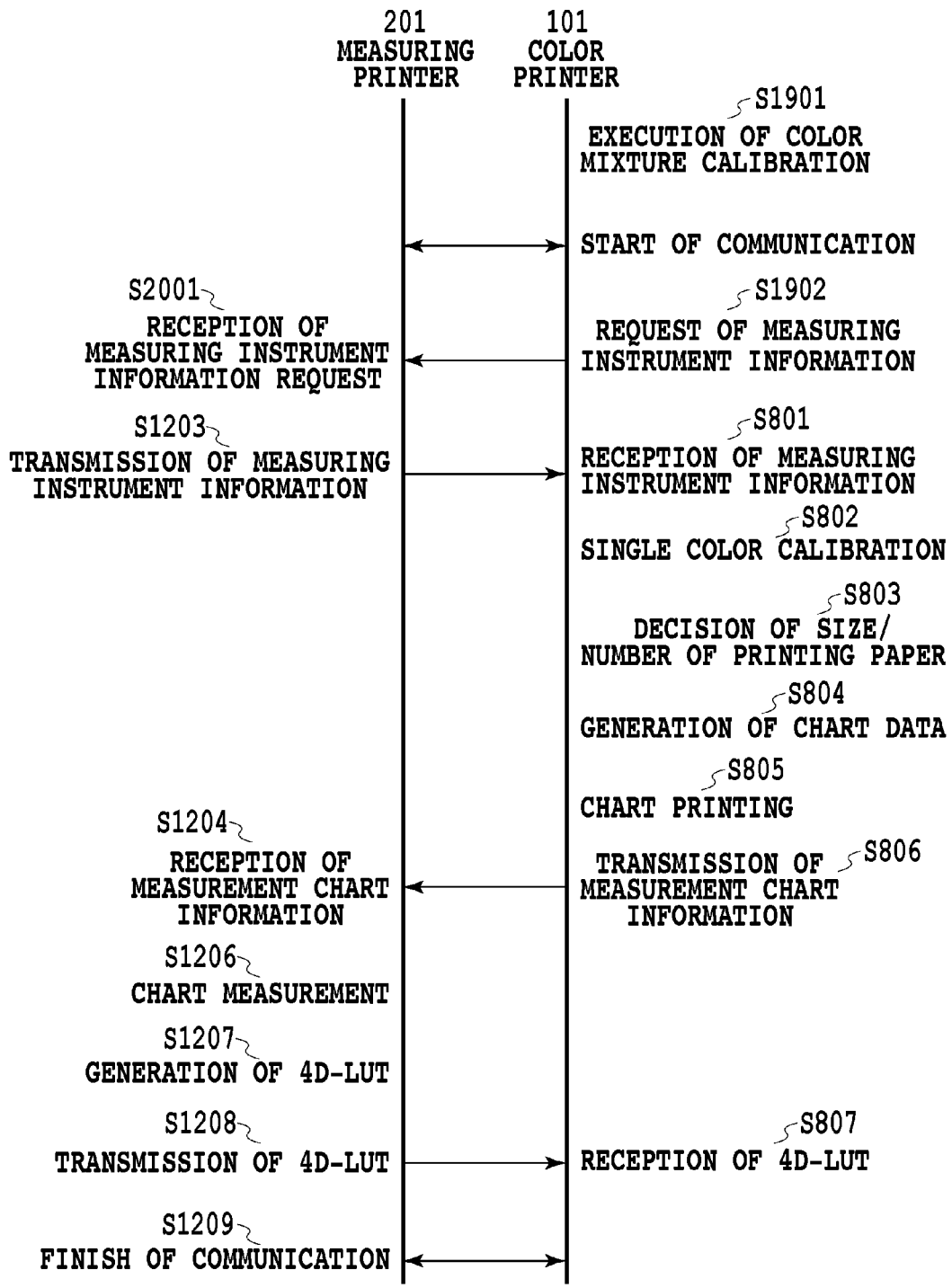
FIG. 22 is a time line diagram showing processing timing of each model in the embodiment 2.

FIG. 22 is a diagram showing mutual communication and operation of the color printer 101 and the measuring printer 201 in the embodiment. Each operation of the color printer 101 and the measuring printer 201 is written, making it correspond to each step in FIG. 8 and FIG. 12, FIG. 19, and FIG. 20.

It is to be noted that in the embodiment, for example, the measuring instrument information of the measuring printer 201 which has executed color mixture calibration in the past may be stored in the RAM 107 in the color printer 101. In this case, when the measuring printer 201 which has executed color mixture calibration in the past is specified from a list of measuring printers, the above-described processing may be performed using the stored measuring instrument information. Namely, the color printer 101 may obtain the measuring instrument information by receiving it from the measuring printer 201, or may obtain the stored measuring instrument information from the RAM 107.

According to the embodiment described above, the execution instruction of color mixture calibration can be performed on the part of the color printer, and it becomes possible to provide an effect similar in the embodiment 1. Since it becomes possible to give such instruction on a device in which color mixture calibration is wanted to be executed, it becomes possible to immediately input a correction execution instruction on the spot if needed.

<Embodiment 3>

In the embodiment 3, will be described an example where an execution instruction of color mixture calibration is issued from a printer driver 1802 on a PC 1801 of FIG. 18, and the color mixture calibration is executed using the color printer 101 and the measuring printer 201.

A user who uses the color printer 101 may give a print instruction from the PC 1801 to the color printer 101 or the measuring printer 201. Consequently, it is also effective in the viewpoint of usability to instruct execution of color mixture calibration to the color printer 101 or the measuring printer 201 from the PC 1801.

Figure 23:
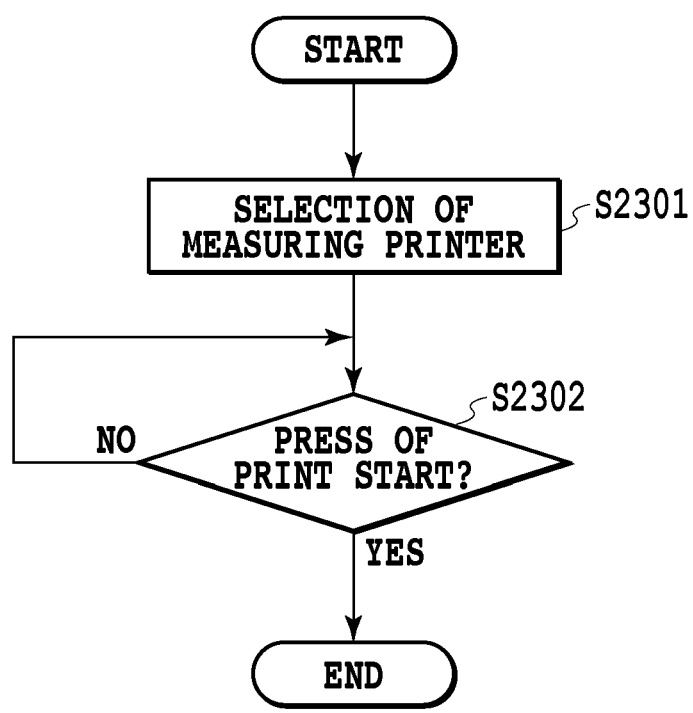
FIG. 23 is a flow chart showing one example of an operation flow chart of a printer driver in an embodiment 3.

FIG. 23 is a flow chart showing operations of a printer driver 1802 in the embodiment.

Figure 24A:
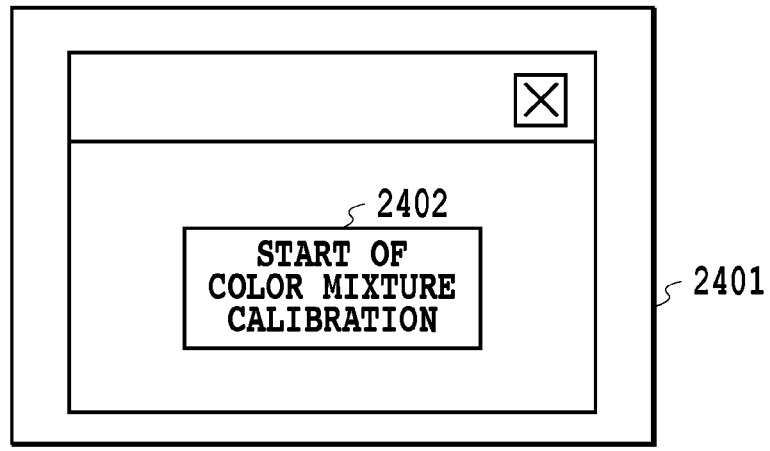
FIGS. 24A to 24C are diagrams showing UI display examples of the printer driver in the embodiment 3.
Figure 24B:
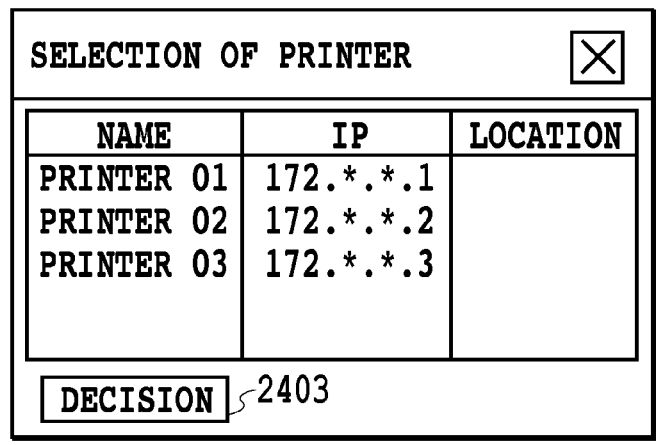

A printer driver screen 2401 as shown in FIG. 24A is displayed on a display screen of the PC 1801 which is not shown. If a color mixture calibration operation 2402 in the printer driver screen is selected, the screen transitions to a screen on which the measuring printer 201 is selected as shown in FIG. 24B. In FIG. 24B, displayed is a list of measuring printers which are previously registered, or which has executed in the past color mixture calibration of the color printer 101 controlled by the printer driver 1802, the measuring printers being connectable with each other through the network 104. The screen includes specific names attached to each measuring printer, address information which can specify a measuring printer, such as an IP address, installation location information of the other measuring printers, etc.

A user selects a model corresponding to the measuring printer 201 on a screen of FIG. 24B, and pushes a decision button 2403 to fix execution of color mixture calibration of the color printer 101 (step S2301).

Figure 24C:
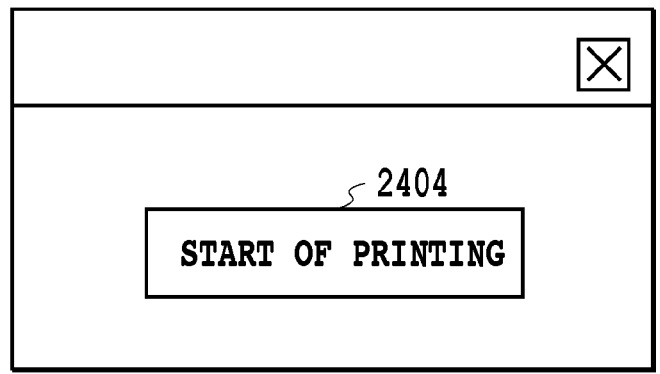

Next, the printer driver 1802 on the PC1801 displays a print start key 2404 for inputting print start of a chart as shown in FIG. 24C to be in an input waiting state (step S2302).

If a command of print start is input in step S2302, the printer driver 1802 transmits the print instruction of the chart used for color mixture calibration to the color printer 101, and finishes.

The CPU 105 of the color printer 101 which has received the chart print instruction from the printer driver 1802 executes the operation from step S1902 of FIG. 19. In addition, the measuring printer 201 executes the operation from step S2001 of FIG. 20.

Figure 25:
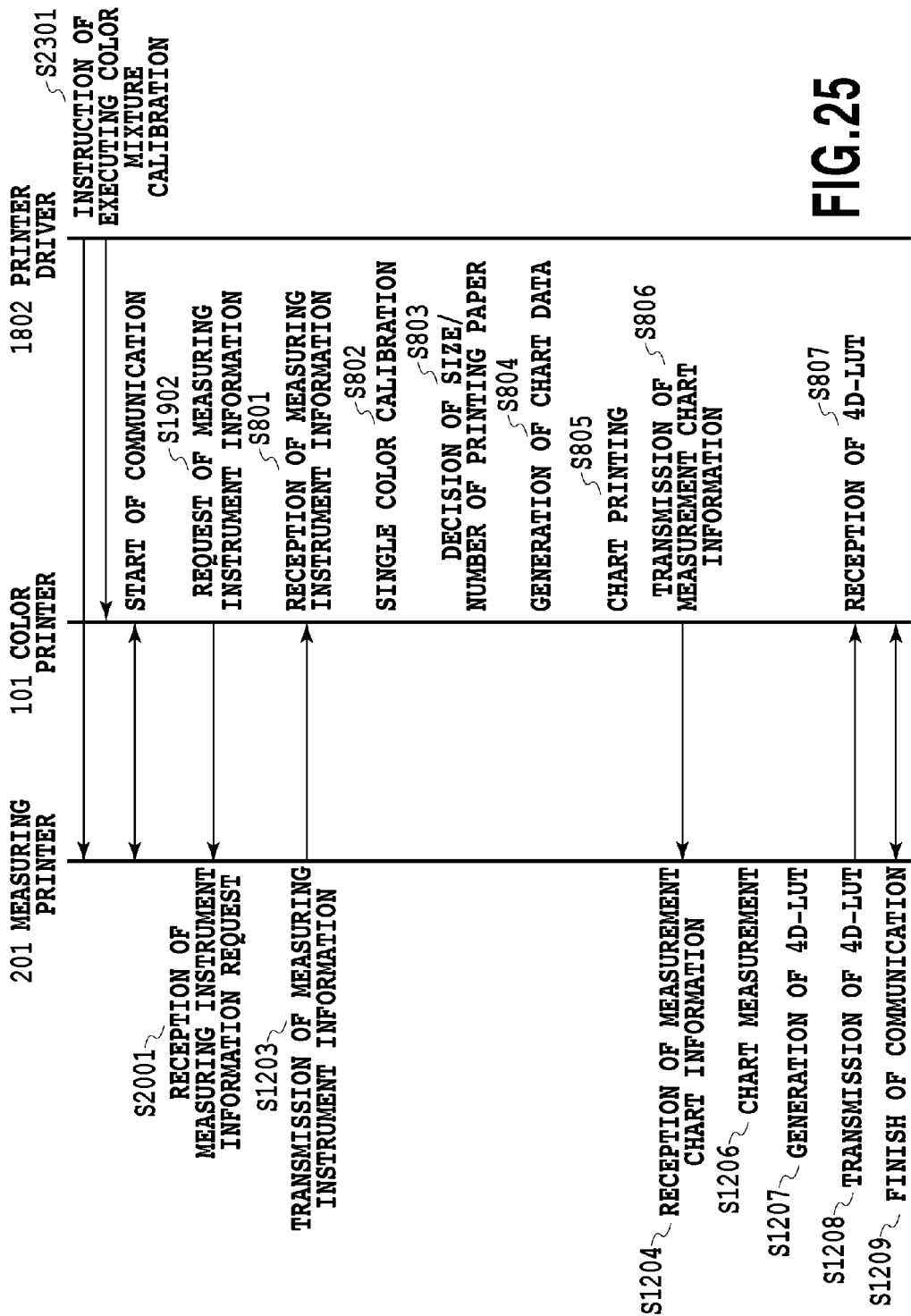
FIG. 25 is a time line diagram showing processing timing of each model in the embodiment 3.

FIG. 25 is a diagram showing mutual communication and operations of the printer driver 1802 on the PC 1801, the color printer 101, and the measuring printer 201. The respective operations are written, making them correspond to each step of FIG. 8, FIG. 12, FIG. 19, FIG. 20, and FIG. 23.

According to the embodiment described above, the execution instruction of color mixture calibration can be performed from the printer driver 1802, and it becomes possible to provide an effect similar in the embodiment 1 and the embodiment 2.

<Embodiment 4>

Figure 12:
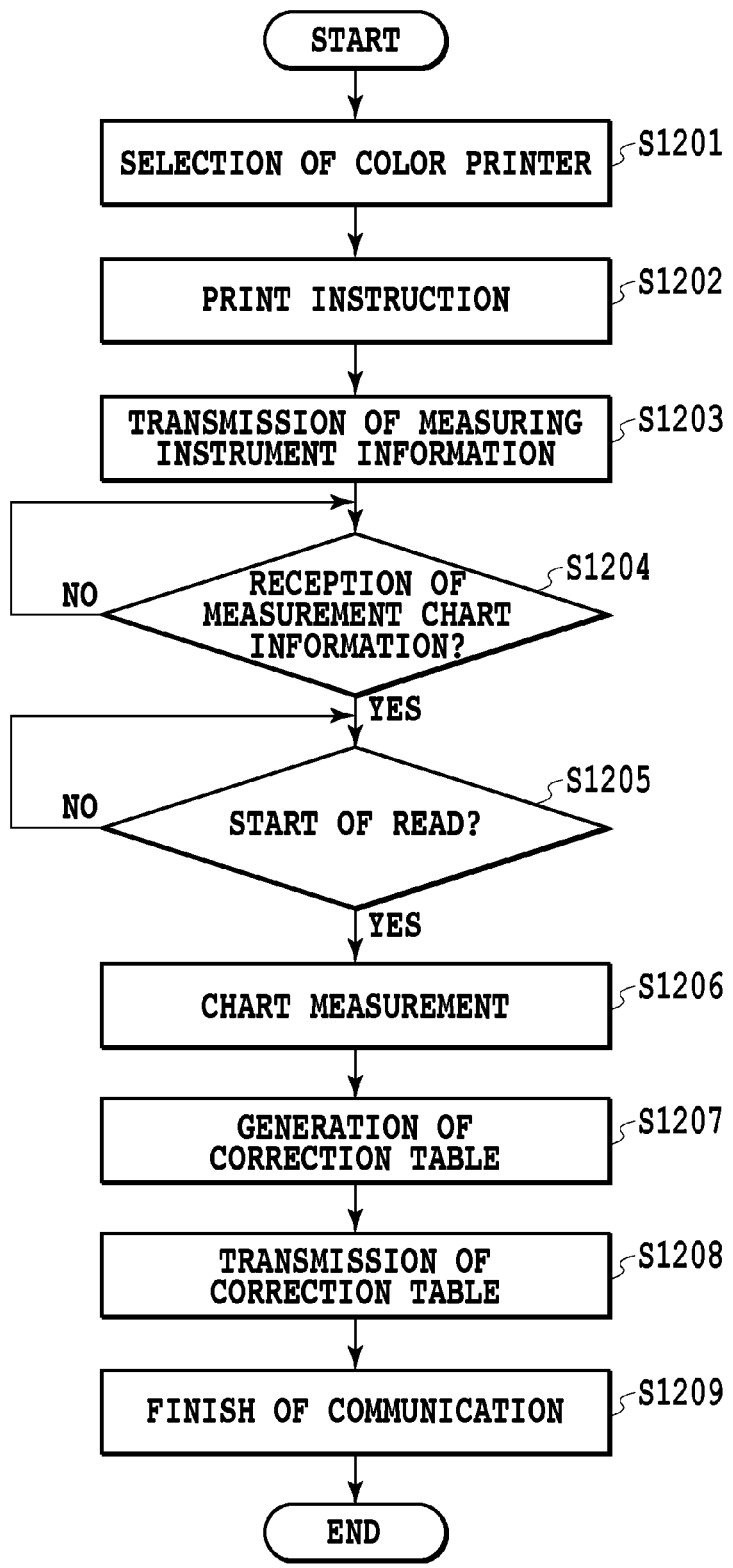
FIG. 12 is a flow chart showing one example of an operation flow chart of the image forming apparatus having the post fuser sensor according to the embodiment.

In the embodiments described hereinbefore, in step S1205 of FIG. 12, measurement charts are stacked and a state of chart read waiting continues. At this time, there occurs a state where an other user cannot operate the measuring printer. Namely, the color mixture calibration operation of the color printer 101 occupies the measuring printer 201. Will be described an embodiment in which the measuring printer 201 can be used immediately, and can also immediately return to the color mixture calibration even in the above case.

Figure 26:
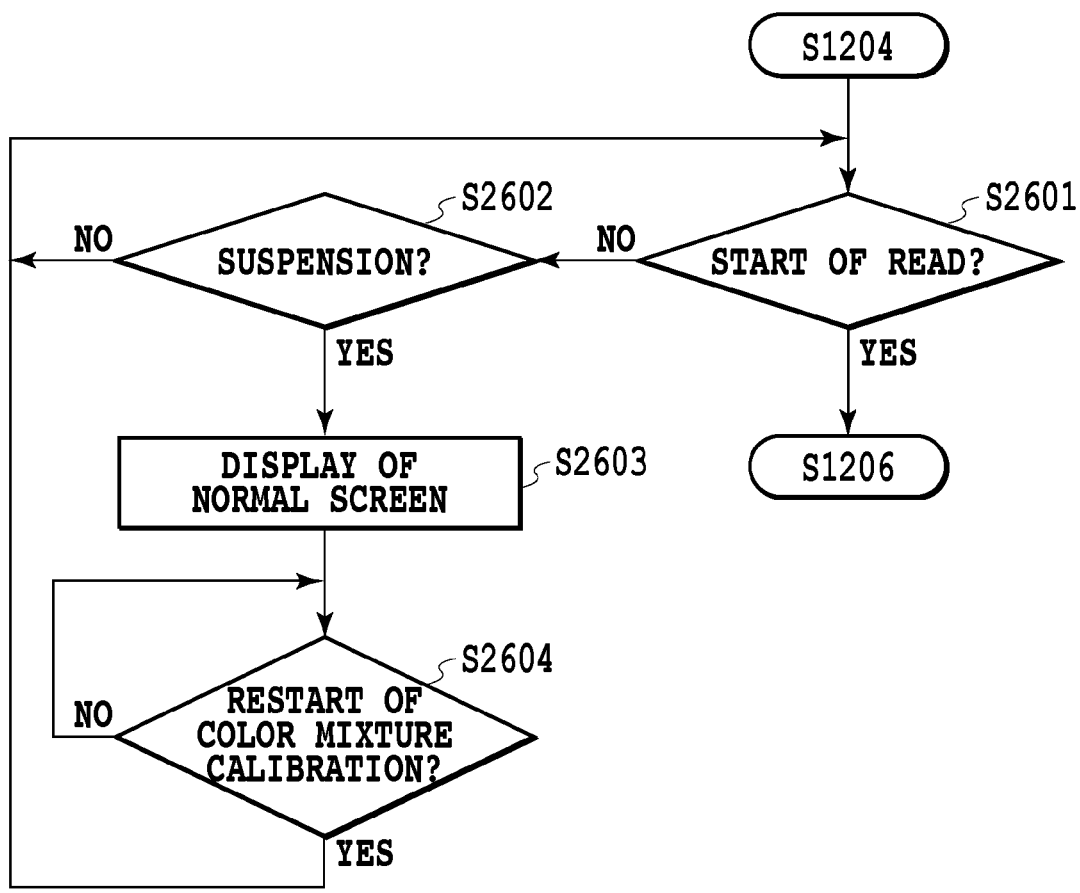
FIG. 26 is a flow chart showing one example of an operation flow chart of an image forming apparatus having a post fuser sensor in an embodiment 4.

The measuring printer basically operates according to the flow chart of FIG. 12. FIG. 26 illustrates steps between step S1204 and step S1206 of FIG. 12. Namely, step S1205 is replaced with a flow chart of FIG. 26.

Figure 27A:
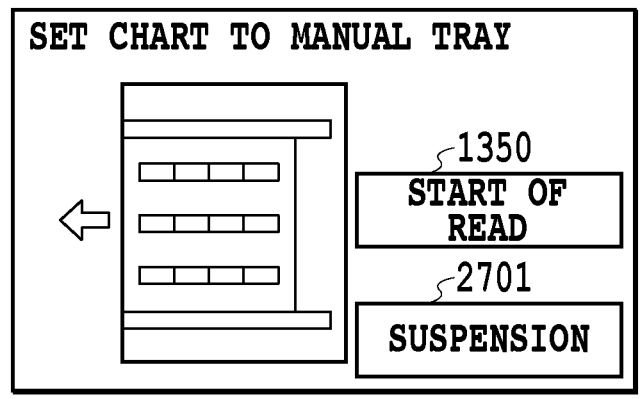
FIGS. 27A and 27B are diagrams showing UI display examples in the image forming apparatus having the post fuser sensor in the embodiment 4.

The display section 210 displays an input screen for chart read from the paper feed section 216 as shown in FIG. 27A, and the CPU 205 waits the chart read (step S2601).

The CPU 205 also monitors whether or not a suspension key 2701 of FIG. 27A is pressed while waiting the chart read (step S2602). Namely, the CPU 205 monitors whether or not an input of an interruption instruction of measurement using a sensor has been received from a user. As long as there is no input in steps S2601 and S2602, the CPU 205 repeats the both steps.

Figure 27B:
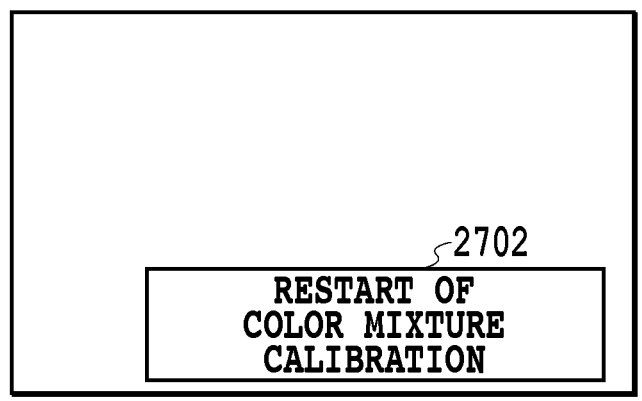

When the suspension key 2701 of FIG. 27A is pressed in step S2602, the display section 210 displays a normal screen along with a color mixture calibration restart key 2702 as shown in FIG. 27B. Here, the normal screen refers to the screen displayed at the time of operations other than color mixture calibration, the normal screen including a top screen of the measuring printer 201 (step S2603).

The CPU 205 waits until the color mixture calibration restart key 2702 is pressed while controlling an usual operation, and returns to step S2601 when it is pressed (step S2604). Namely, when an input of a restart instruction of the interrupted processing is received from the user, processing to return to step S2601 is performed.

According to the embodiment described above, it becomes possible to provide each operation described in the embodiments 1 to 3 without occupying the measuring printer 201 only with color mixture calibration.

<Embodiment 5>

Figure 28:
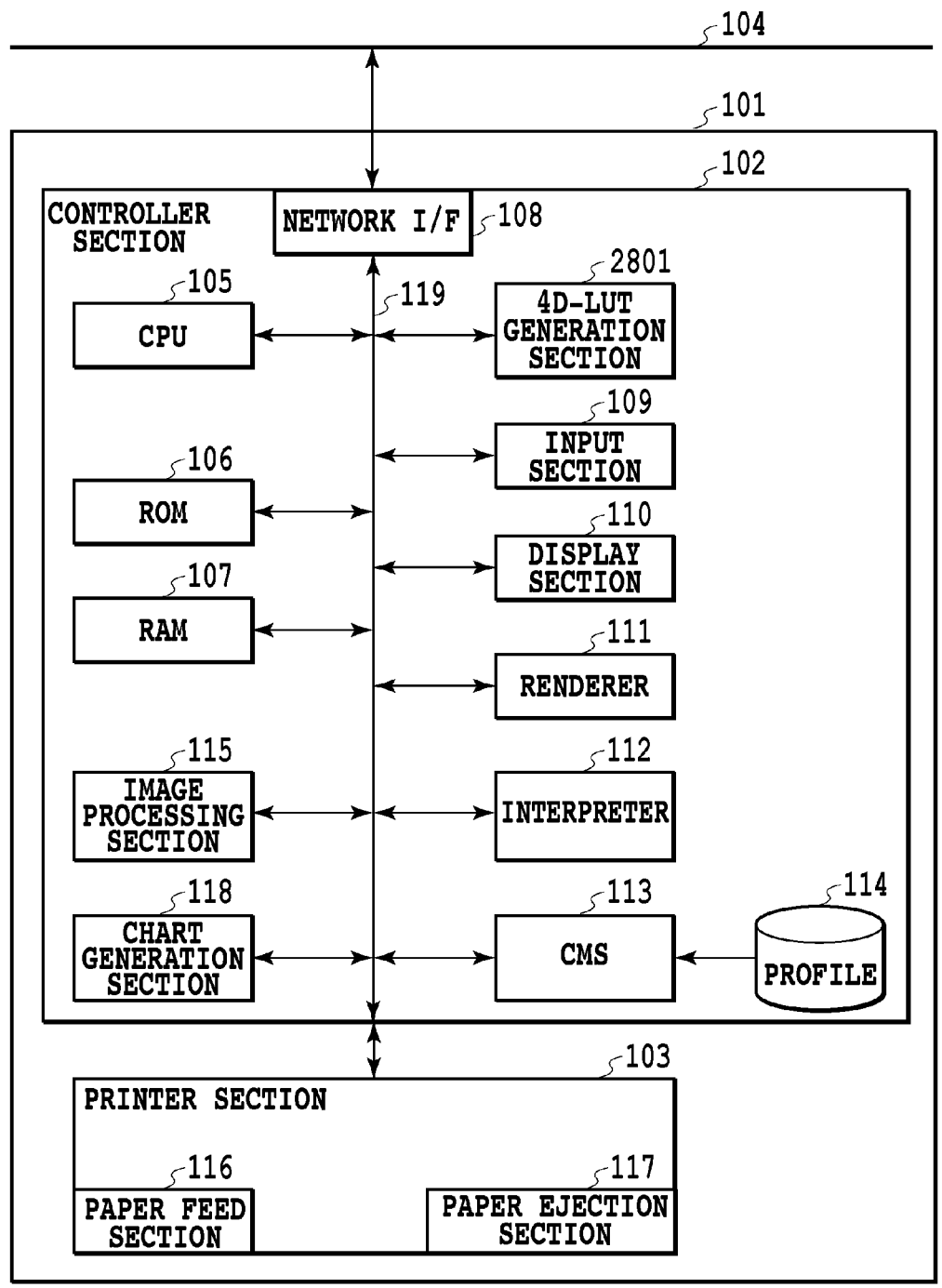
FIG. 28 is a system configuration diagram of a color printer without a post fuser sensor in an embodiment 5.

FIG. 28 shows a configuration of the color printer 101 described in the embodiment. Here, the color printer 101 has a 4D-LUT generation section 2801.

The CPU 105 receives the measurement data measured by the above-mentioned measuring printer 201 through the network 104, and stores it in the RAM 107. The 4D-LUT generation section 2801 generates a 4D-LUT which corrects a color mixture of the color printer 101 by an operation similar to the 4D-LUT generation section 218.

It is to be noted that in this case, at least information on the number of charts, a paper size, and the number of papers per sheet among items shown in FIG. 10 may just be included in the measurement chart information.

According to the embodiment described above, it becomes possible to generate the 4D-LUT which corrects the color mixture of the printer 101 without using an operation resource of the 4D-LUT generation section 218 of the measuring printer 201.

<Other Embodiment>

In each embodiment described above, it has been described using the example where the image forming apparatus which performs measurement is the image forming apparatus having the post fuser sensor. An effect of environmental changes which may be caused until fusing can be reduced by using the post fuser sensor. However, an image forming apparatus having a sensor which detects a density on a photoconductive drum or a primary transfer belt may perform measurement. Namely, it is possible to apply processing of the above-described each embodiment also to an image forming apparatus having an arbitrary type of sensor. In this case, for example, it can be understood by the color printer 101 what type of sensor can be utilized by including information which identifies a type of sensor as the measuring instrument information from the measuring printer 201. In addition, for example, when a plurality of available types of sensors is mounted in the measuring printer 201, it is also possible to include information indicating that measurement by which type of sensor is requested in the measurement chart information from the color printer 101.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-142868, filed Jun. 28, 2011, which is hereby incorporated by reference herein in its entirety.

What is claimed is:

1. A first image forming apparatus capable of communicating with a second image forming apparatus having measuring instrument having at least one sensor that measures a color, the first image forming apparatus comprising:
    an obtaining unit configured to obtain information on the number of sensors fixed in the measuring instrument arranged in the second image forming apparatus, position of the sensor fixed in the measurement instrument, measurable range of the measuring instrument in a chart image, and a patch size on the chart image capable of being measured by the measuring instrument, the information being specific to the measuring instrument arranged in the second image forming apparatus and capable of being obtained from the second image forming apparatus to generate, by the first image forming apparatus, the chart image capable of being measured by the measuring instrument in the second image forming apparatus;
    a chart image generation unit configured to generate the chart image by using the information obtained by the obtaining unit;
    a transmission unit configured to transmit measurement chart information including conditions for measuring the chart image generated by the chart image generation unit to the second image forming apparatus;
    a reception unit configured to receive data that is obtained from the measurement result of the chart image in the second image forming apparatus using the measurement chart information transmitted by the transmission unit, and that is transmitted from the second image forming apparatus, the data being for correcting a color reproduction characteristic; and
    an image forming unit configured to form an image using the data received by the reception unit.

2. The first image forming apparatus according to claim 1, wherein the reception unit receives as the data a correction table in which a color reproduction characteristic has been corrected based on the measurement chart information.

3. The first image forming apparatus according to claim 1,
wherein the reception unit receives as the data measurement data measured using the measurement chart information,
wherein the first image forming apparatus further comprises a correction table generation unit configured to generate a correction table in which the color reproduction characteristic is corrected using the measurement data received by the reception unit, and
wherein the first image forming apparatus forms an image using the correction table generated by the correction table generation unit.

4. The first image forming apparatus according to claim 1, further comprising:
an input unit configured to receive an input of a correction execution instruction; and
a request unit configured to request the information of the second image forming apparatus according to the input of the correction execution instruction,
wherein the obtaining unit obtains the information transmitted from the second image forming apparatus with respect to a request by the request unit.

5. The first image forming apparatus according to claim 4, wherein the input unit receives the input of the correction execution instruction from an information processor capable of communicating with the first image forming apparatus.

6. A second image forming apparatus capable of communicating with a first image forming apparatus and having measuring instrument having at least one sensor that measures a color, the second image forming apparatus comprising:
a measuring instrument information transmission unit configured to transmit, to the first image forming apparatus, information on the number of sensors fixed in the measuring instrument arranged in the second image forming apparatus, position of the sensor fixed in the measurement instrument, measurable range of the measuring instrument in a chart image, and a patch size on the chart image capable of being measured by the measuring instrument, the information being specific to the measuring instrument arranged in the second image forming apparatus and causing the first image forming apparatus to generate the chart image capable of being measured by the measuring instrument in the second image forming apparatus;
a measurement chart information reception unit configured to receive, from the first image forming apparatus, measurement chart information including conditions for measuring the chart image generated by the first image forming apparatus with the information transmitted by the measuring instrument information transmission unit;
a data generation unit configured to measure the chart image generated by the first image forming apparatus by using the sensor and the measurement chart information received by the measurement chart information reception unit, and to generate data for correcting a color reproduction characteristic of the first image forming apparatus; and
a data transmission unit configured to transmit the data generated by the data generation unit to the first image forming apparatus.

7. The second image forming apparatus according to claim 6, wherein the data generation unit generates as the data a correction table in which a color reproduction characteristic has been corrected based on the measurement chart information.

8. The second image forming apparatus according to claim 6, wherein the data generation unit generates as the data measurement data measured using the measurement chart information.

9. The second image forming apparatus according to claim 6, further comprising an input unit configured to receive an input of a correction execution instruction,
wherein the measuring instrument information transmission unit transmits the information to the first image forming apparatus in case of receiving the input of the correction execution instruction.

10. The second image forming apparatus according to claim 6, further comprising:
an interruption instruction input unit configured to receive an input of an interruption instruction of measurement using the sensor; and
a restart instruction input unit configured to receive an input of a restart instruction of the interrupted processing in a case where the interruption instruction is input.

11. The first image forming apparatus according to claim 1, wherein the measurement chart information includes at least the number of lattice points of a correction table, a data bit depth, and correction target information.

12. The second image forming apparatus according to claim 6, wherein the measurement chart information includes at least the number of lattice points of a correction table, a data bit depth, and correction target information.

13. The first image forming apparatus according to claim 1, wherein the sensor that measures is provided between a fuser and a paper ejection section in a paper transport section of the second image processing apparatus.

14. The second image forming apparatus according to claim 6, wherein the sensor that measures is provided between a fuser and a paper ejection section in a paper transport section.

15. A control method for a first image forming apparatus capable of communicating with a second image forming apparatus having measure instrument having at least one sensor that measures a color, the control method comprising the steps of:
obtaining information on the number of sensors fixed in the measuring instrument arranged in the second image forming apparatus, position of the sensor fixed in the measurement instrument, measurable range of the measuring instrument in a chart image, and a patch size on the chart image capable of being measured by the measuring instrument, the information being specific to the measuring instrument arranged in the second image forming apparatus and capable of being obtained from the second image forming apparatus to generate, by the first image forming apparatus, the chart image capable of being measured by the measuring instrument in the second image forming apparatus;
generating the chart image by using the information obtained in the obtaining step;
transmitting measurement chart information including conditions for measuring the chart image generated in the generation step to the second image forming apparatus;
receiving data that is obtained from a measurement result of the chart image in the second image forming apparatus using the measurement chart information transmitted by the transmission step, and that is transmitted from the second image forming apparatus, the data being for correcting a color reproduction characteristic; and
forming an image using the data received in the reception step.

16. A control method for a second image forming apparatus capable of communicating with a first image forming apparatus and having measurement instrument having at least one sensor that measures a color, the control method comprising the steps of:

transmitting, to the first image forming apparatus, information on the number of sensors fixed in the measuring instrument arranged in the second image forming apparatus, position of the sensor fixed in the measurement instrument, measurable range of the measuring instrument in a chart image, and a patch size on the chart image capable of being measured by the measuring instrument, the information being specific to the measuring instrument arranged in the second image forming apparatus and causing the first image forming apparatus to generate the chart image capable of being measured by the measuring instrument in the second image forming apparatus;

receiving, from the first image forming apparatus, measurement chart information including conditions for measuring the chart image generated by the first image forming apparatus with the information transmitted in the transmitting step;

measuring the chart image generated by the first image forming apparatus by using the sensor and the measurement chart information received in the measurement chart information reception step, and generating data for correcting a color reproduction characteristic of the first image forming apparatus; and transmitting the data generated in the data generation step to the first image forming apparatus.

17. A program on a non-transitory computer-readable storage medium, the program causing a computer to execute the control method for the first image forming apparatus according to claim 15.

18. A program on a non-transitory computer-readable storage medium, the program causing a computer to execute the control method for the second image forming apparatus according to claim 16.

* * * * *